US008795061B2

(12) United States Patent
Burrill et al.

(10) Patent No.: US 8,795,061 B2
(45) Date of Patent: Aug. 5, 2014

(54) AUTOMATED DATA COLLECTION SYSTEM FOR CASINO TABLE GAME ENVIRONMENTS

(75) Inventors: Nevin A. Burrill, Henderson, NV (US); Timothy W. Moser, Las Vegas, NV (US); Roger William Harris, Reno, NV (US); Eduardo Samuel Meza, Las Vegas, NV (US); Steven M. Pankas, Henderson, NV (US); Gavin McPhail, Las Vegas, NV (US)

(73) Assignee: IGT, Las Vegas, NV (US)

(*) Notice: Subject to any disclaimer, the term of this patent is extended or adjusted under 35 U.S.C. 154(b) by 1498 days.

(21) Appl. No.: 11/870,233

(22) Filed: Oct. 10, 2007

(65) Prior Publication Data

US 2008/0113772 A1 May 15, 2008

Related U.S. Application Data

(60) Provisional application No. 60/858,046, filed on Nov. 10, 2006.

(51) Int. Cl.
*A63F 9/24* (2006.01)
*G06F 17/00* (2006.01)
*G07F 17/32* (2006.01)

(52) U.S. Cl.
CPC ........ *G07F 17/3239* (2013.01); *G07F 17/3237* (2013.01); *G07F 17/32* (2013.01)
USPC .................................. 463/25; 463/40; 463/42

(58) Field of Classification Search
CPC . G07F 17/32; G07F 17/3206; G07F 17/3234; G07F 17/3237; G07F 17/3239; G07F 17/3255; A63F 2003/00164
USPC ........................................................... 463/29
See application file for complete search history.

(56) References Cited

U.S. PATENT DOCUMENTS 4,836,553 A 6/1989 Suttle et al.
5,103,081 A 4/1992 Fisher et al.
5,534,917 A 7/1996 MacDougall
5,586,936 A 12/1996 Bennett et al.
5,636,209 A 6/1997 Perlman (Continued)

FOREIGN PATENT DOCUMENTS

EP 0 999 517 5/2000
EP 1 936 541 6/2008

(Continued)

OTHER PUBLICATIONS

Unpublished U.S. Appl. No. 12/414,470 entitled "Intelligent Player Tracking Card and Wagering Token tracking Techniques," filed by Mattice et al,.on Mar. 30, 2009.

(Continued)

*Primary Examiner* — Werner Garner
(74) *Attorney, Agent, or Firm* — Neal, Gerber & Eisenberg LLP

(57) ABSTRACT

Various techniques are disclosed for facilitating player tracking activities and/or player rating activities at a casino gaming table. One aspect is directed to different techniques for automatically starting, suspending, resuming and/or ending player tracking sessions at one or more table games. Another aspect is directed to different techniques for automatically starting, suspending, resuming and/or ending player rating sessions at one or more table games.

4 Claims, 9 Drawing Sheets

(56) References Cited

U.S. PATENT DOCUMENTS

| | | | |
|---|---|---|---|
| 5,651,548 | A | 7/1997 | French et al. |
| 5,665,961 | A | 9/1997 | Matzka |
| 5,707,287 | A | 1/1998 | McCrea et al. |
| 5,735,742 | A | 4/1998 | French et al. |
| 5,743,523 | A | 4/1998 | Kelly et al. |
| 5,772,506 | A | 6/1998 | Marks et al. |
| 5,781,647 | A | 7/1998 | Fishbine et al. |
| 5,788,574 | A | 8/1998 | Ornstein et al. |
| 5,794,964 | A | 8/1998 | Jones et al. |
| 5,795,225 | A | 8/1998 | Jones et al. |
| 5,799,946 | A | 9/1998 | Groussman |
| 5,823,873 | A | 10/1998 | Moody |
| 5,851,011 | A | 12/1998 | Lott |
| 5,911,626 | A | 6/1999 | McCrea et al. |
| 5,935,002 | A | 8/1999 | Falciglia |
| 5,941,769 | A | 8/1999 | Order |
| 5,951,012 | A | 9/1999 | Feola |
| 5,957,776 | A | 9/1999 | Hoehne et al. |
| 6,001,016 | A | 12/1999 | Walker et al. |
| 6,039,650 | A | 3/2000 | Hill et al. |
| 6,056,641 | A | 5/2000 | Webb |
| 6,077,163 | A | 6/2000 | Walker et al. |
| 6,110,041 | A | 8/2000 | Walker et al. |
| 6,117,012 | A | 9/2000 | McCrea et al. |
| 6,149,522 | A | 11/2000 | Alcorn et al. |
| 6,165,069 | A | 12/2000 | Sines et al. |
| 6,186,895 | B1 | 2/2001 | Oliver |
| 6,267,671 | B1 | 7/2001 | Hogan |
| 6,299,536 | B1 | 10/2001 | Hill |
| 6,313,871 | B1 | 11/2001 | Schubert |
| 6,319,125 | B1 | 11/2001 | Acres |
| 6,346,044 | B1 | 2/2002 | McCrea, Jr. |
| 6,460,848 | B1 | 10/2002 | Soltys et al. |
| 6,464,584 | B2 | 10/2002 | Oliver |
| 6,511,068 | B1 | 1/2003 | Sklansky et al. |
| 6,514,140 | B1 | 2/2003 | Storch |
| 6,517,073 | B1 | 2/2003 | Vancura |
| 6,517,435 | B2 | 2/2003 | Soltys et al. |
| 6,530,837 | B2 | 3/2003 | Soltys et al. |
| 6,533,276 | B2 | 3/2003 | Soltys et al. |
| 6,533,662 | B2 | 3/2003 | Soltys et al. |
| 6,579,180 | B2 | 6/2003 | Soltys et al. |
| 6,607,195 | B2 | 8/2003 | Vancura |
| 6,620,047 | B1 | 9/2003 | Alcorn et al. |
| 6,629,591 | B1 | 10/2003 | Griswold |
| 6,645,077 | B2 | 11/2003 | Rowe |
| 6,672,589 | B1 | 1/2004 | Lemke et al. |
| 6,685,564 | B2 | 2/2004 | Oliver |
| 6,685,567 | B2 | 2/2004 | Cockerville |
| 6,698,759 | B2 | 3/2004 | Webb et al. |
| 6,758,751 | B2 | 7/2004 | Soltys et al. |
| 6,800,029 | B2 | 10/2004 | Rowe et al. |
| 6,804,763 | B1 | 10/2004 | Stockdale |
| 6,848,994 | B1 | 2/2005 | Knust et al. |
| 6,863,608 | B1 | 3/2005 | LeMay et al. |
| 6,884,168 | B2 | 4/2005 | Wood et al. |
| 6,923,446 | B2 | 8/2005 | Snow |
| 6,923,724 | B2 | 8/2005 | Williams |
| 6,962,530 | B2 | 11/2005 | Jackson |
| 7,011,309 | B2 | 3/2006 | Soltys et al. |
| 7,017,805 | B2 | 3/2006 | Meehan |
| 7,018,291 | B1 | 3/2006 | Lemke et al. |
| 7,029,009 | B2 | 4/2006 | Grauzer et al. |
| 7,035,276 | B2 | 4/2006 | Bradford |
| 7,058,204 | B2 | 6/2006 | Hildreth et al. |
| 7,111,141 | B2 | 9/2006 | Nelson |
| 7,111,845 | B2 | 9/2006 | Walker et al. |
| 7,114,718 | B2 | 10/2006 | Grauzer et al. |
| 7,165,770 | B2 | 1/2007 | Snow |
| 7,267,614 | B1 | 9/2007 | Jorasch et al. |
| 7,384,339 | B2 | 6/2008 | LeMay et al. |
| 7,510,190 | B2 | 3/2009 | Snow et al. |
| 7,515,718 | B2 | 4/2009 | Nguyen et al. |
| 7,549,920 | B2 | 6/2009 | Jorasch et al. |
| 7,878,896 | B2 | 2/2011 | Jorasch et al. |
| 7,927,212 | B2 | 4/2011 | Hedrick et al. |
| 8,016,657 | B2 | 9/2011 | Walker et al. |
| 8,029,357 | B2 | 10/2011 | Jorasch et al. |
| 8,118,669 | B2 | 2/2012 | Rader et al. |
| 2002/0002076 | A1 | 1/2002 | Schneier et al. |
| 2002/0034978 | A1 | 3/2002 | Legge et al. |
| 2002/0042298 | A1 | 4/2002 | Soltys et al. |
| 2002/0042299 | A1 | 4/2002 | Soltys et al. |
| 2002/0068625 | A1 | 6/2002 | Soltys et al. |
| 2002/0072405 | A1 | 6/2002 | Soltys et al. |
| 2002/0072406 | A1 | 6/2002 | Soltys et al. |
| 2002/0094855 | A1 | 7/2002 | Berman |
| 2002/0177480 | A1 | 11/2002 | Rowe |
| 2003/0032474 | A1 | 2/2003 | Kaminkow et al. |
| 2003/0036425 | A1 | 2/2003 | Kaminkow et al. |
| 2003/0078103 | A1 | 4/2003 | LeMay et al. |
| 2003/0087696 | A1 | 5/2003 | Soltys et al. |
| 2003/0148812 | A1 | 8/2003 | Paulson |
| 2003/0171142 | A1 | 9/2003 | Kaji et al. |
| 2003/0203756 | A1 | 10/2003 | Jackson |
| 2003/0232647 | A1 | 12/2003 | Moser |
| 2004/0056418 | A1 | 3/2004 | Wirth |
| 2004/0056419 | A1 | 3/2004 | Wirth |
| 2004/0147314 | A1 | 7/2004 | LeMay et al. |
| 2004/0192434 | A1 | 9/2004 | Walker et al. |
| 2004/0251630 | A1 | 12/2004 | Sines et al. |
| 2005/0026680 | A1 | 2/2005 | Gururajan |
| 2005/0026683 | A1 | 2/2005 | Fujimoto |
| 2005/0051955 | A1 | 3/2005 | Schubert et al. |
| 2005/0051965 | A1 | 3/2005 | Gururajan |
| 2005/0054408 | A1 | 3/2005 | Steil et al. |
| 2005/0082755 | A1 | 4/2005 | Snow |
| 2005/0116020 | A1 | 6/2005 | Smolucha et al. |
| 2005/0119048 | A1 | 6/2005 | Soltys et al. |
| 2005/0127606 | A1 | 6/2005 | Snow et al. |
| 2005/0192099 | A1 | 9/2005 | Nguyen et al. |
| 2005/0242500 | A1 | 11/2005 | Downs, III |
| 2005/0272501 | A1 | 12/2005 | Tran et al. |
| 2005/0277463 | A1 | 12/2005 | Knust et al. |
| 2005/0282622 | A1 | 12/2005 | Lindquist |
| 2005/0288083 | A1 | 12/2005 | Downs, III |
| 2006/0001211 | A1 | 1/2006 | Lewis et al. |
| 2006/0019739 | A1 | 1/2006 | Soltys |
| 2006/0027970 | A1 | 2/2006 | Kyrychenko |
| 2006/0036874 | A1 | 2/2006 | Cockerille et al. |
| 2006/0040730 | A1 | 2/2006 | Walker et al. |
| 2006/0046836 | A1 | 3/2006 | Walker et al. |
| 2006/0052109 | A1 | 3/2006 | Ashman, Jr. et al. |
| 2006/0058082 | A1 | 3/2006 | Crawford et al. |
| 2006/0058083 | A1 | 3/2006 | Crawford et al. |
| 2006/0058084 | A1 | 3/2006 | Crawford et al. |
| 2006/0058085 | A1 | 3/2006 | White et al. |
| 2006/0058086 | A1 | 3/2006 | White et al. |
| 2006/0058087 | A1 | 3/2006 | White et al. |
| 2006/0058088 | A1 | 3/2006 | Crawford et al. |
| 2006/0058089 | A1 | 3/2006 | White et al. |
| 2006/0058090 | A1 | 3/2006 | Crawford et al. |
| 2006/0058091 | A1 | 3/2006 | Crawford et al. |
| 2006/0058092 | A1 | 3/2006 | Crawford et al. |
| 2006/0058093 | A1 | 3/2006 | White et al. |
| 2006/0063577 | A1 | 3/2006 | Downs, III et al. |
| 2006/0063586 | A1 | 3/2006 | Krenn et al. |
| 2006/0066052 | A1 | 3/2006 | White et al. |
| 2006/0068864 | A1 | 3/2006 | White et al. |
| 2006/0068865 | A1 | 3/2006 | White et al. |
| 2006/0068866 | A1 | 3/2006 | White et al. |
| 2006/0068868 | A1 | 3/2006 | Crawford et al. |
| 2006/0068869 | A1 | 3/2006 | White et al. |
| 2006/0068870 | A1 | 3/2006 | Crawford et al. |
| 2006/0068871 | A1 | 3/2006 | Crawford et al. |
| 2006/0068879 | A1 | 3/2006 | Crawford et al. |
| 2006/0068899 | A1 | 3/2006 | White et al. |
| 2006/0073885 | A1 | 4/2006 | Rowe et al. |
| 2006/0076401 | A1 | 4/2006 | Frerking |
| 2006/0105836 | A1 | 5/2006 | Walker et al. |
| 2006/0121972 | A1 | 6/2006 | Walker et al. |
| 2006/0128462 | A1 | 6/2006 | Jorasch et al. |
| 2006/0160600 | A1 | 7/2006 | Hill et al. |
| 2006/0160608 | A1 | 7/2006 | Hill et al. |

(56) References Cited

U.S. PATENT DOCUMENTS

| | | | | |
|---|---|---|---|---|
| 2006/0165254 | A1 | 7/2006 | Fujimoto et al. | |
| 2006/0177109 | A1 | 8/2006 | Storch | |
| 2006/0202422 | A1 | 9/2006 | Bahar | |
| 2006/0223638 | A1 | 10/2006 | Koyama et al. | |
| 2006/0252521 | A1 | 11/2006 | Gururajan et al. | |
| 2006/0252530 | A1 | 11/2006 | Obergerger et al. | |
| 2006/0252531 | A1 | 11/2006 | Kando et al. | |
| 2006/0252554 | A1 | 11/2006 | Gururajan et al. | |
| 2006/0258427 | A1 | 11/2006 | Rowe et al. | |
| 2006/0258442 | A1 | 11/2006 | Ryan | |
| 2006/0264252 | A1 | 11/2006 | White et al. | |
| 2006/0277100 | A1 | 12/2006 | Parham | |
| 2006/0287045 | A1 | 12/2006 | Walker et al. | |
| 2006/0287066 | A1 | 12/2006 | Crawford et al. | |
| 2006/0287067 | A1 | 12/2006 | White et al. | |
| 2006/0287068 | A1 | 12/2006 | Walker et al. | |
| 2006/0287071 | A1 | 12/2006 | Walker et al. | |
| 2006/0287101 | A1 | 12/2006 | Crawford et al. | |
| 2006/0287102 | A1 | 12/2006 | White et al. | |
| 2006/0287103 | A1 | 12/2006 | Crawford et al. | |
| 2006/0287104 | A1 | 12/2006 | White et al. | |
| 2006/0287961 | A1 | 12/2006 | Mori et al. | |
| 2006/0293099 | A1 | 12/2006 | Cooper | |
| 2007/0004505 | A1 | 1/2007 | Walker et al. | |
| 2007/0045957 | A1 * | 3/2007 | Blair, Jr. | 273/274 |
| 2007/0045958 | A1 | 3/2007 | Rader et al. | |
| 2007/0087834 | A1 | 4/2007 | Moser et al. | |
| 2007/0094721 | A1 | 4/2007 | Nguyen et al. | |
| 2007/0115125 | A1 | 5/2007 | Lyon | |
| 2007/0135215 | A1 | 6/2007 | Walker et al. | |
| 2007/0155483 | A1 | 7/2007 | Walker et al. | |
| 2007/0243934 | A1 | 10/2007 | Little et al. | |
| 2007/0243935 | A1 | 10/2007 | Huizinga | |
| 2007/0254732 | A1 | 11/2007 | Walker et al. | |
| 2007/0293309 | A1 | 12/2007 | Jorasch et al. | |
| 2007/0293311 | A1 * | 12/2007 | Walker et al. | 463/29 |
| 2007/0298873 | A1 | 12/2007 | Nguyen et al. | |
| 2008/0076506 | A1 | 3/2008 | Nguyen et al. | |
| 2008/0076572 | A1 | 3/2008 | Nguyen et al. | |
| 2008/0150476 | A1 | 6/2008 | Lamothe | |
| 2008/0188292 | A1 | 8/2008 | Walker et al. | |
| 2008/0231457 | A1 | 9/2008 | Matice et al. | |
| 2008/0300044 | A1 | 12/2008 | Ohtani | |
| 2008/0305862 | A1 | 12/2008 | Walker et al. | |
| 2009/0069090 | A1 | 3/2009 | Moser et al. | |
| 2009/0093300 | A1 | 4/2009 | Lutnick et al. | |
| 2009/0121431 | A1 | 5/2009 | Rader et al. | |
| 2009/0121432 | A1 | 5/2009 | Rader et al. | |
| 2009/0124376 | A1 | 5/2009 | Kelly et al. | |
| 2009/0124377 | A1 | 5/2009 | Rader et al. | |
| 2009/0131151 | A1 | 5/2009 | Harris et al. | |
| 2009/0191955 | A1 | 7/2009 | Seelig et al. | |
| 2009/0253498 | A1 | 10/2009 | Wolf et al. | |
| 2010/0062854 | A1 | 3/2010 | Goto et al. | |
| 2010/0093428 | A1 | 4/2010 | Mattice et al. | |
| 2010/0093429 | A1 | 4/2010 | Mattice et al. | |
| 2010/0210350 | A9 | 8/2010 | Walker et al. | |
| 2010/0227670 | A1 | 9/2010 | Arezina et al. | |

FOREIGN PATENT DOCUMENTS

| | | |
|---|---|---|
| WO | WO 00/33246 | 6/2000 |
| WO | 2005/110564 | 11/2005 |
| WO | 2006/090197 | 8/2006 |
| WO | 2006/124912 | 11/2006 |
| WO | 2007/067213 | 6/2007 |
| WO | WO 2007/133690 | 11/2007 |
| WO | 2008/028148 | 3/2008 |
| WO | 2008/061001 | 5/2008 |
| WO | 2009/061618 | 5/2009 |
| WO | WO 2010/114575 | 10/2010 |
| WO | WO 2010/114576 | 10/2010 |

OTHER PUBLICATIONS

Unpublished U.S. Appl. No. 12/414,468 entitled "Intelligent Wagering Token and Wagering Token Tracking Techniques," filed by Mattice et al,.on Mar. 30, 2009.

Unpublished PCT Application No. PCT/US2009/057351entitled "Intelligent Player Tracking Card and Wagering Token Tracking Techniques", filed by Mattice et al., on Sep. 17, 2009.

Unpublished PCT Application No. PCT/US2009/057354 entitled "Intelligent Wagering Token and Wagering Token Tracking Techniques", filed by Mattice et al., on Sep. 17, 2009.

Magellan Technology Rolls Out PJM into Casinos Worldwide, Magellan Technology Pty Ltd., Nov. 22, 2006.

International Preliminary Report on Patentability dated May 22, 2009, issued in PCT/US2007/084254.

International Search Report and Written Opinion, dated Jan. 1, 2009, issued in PCT/US2008/080820 11 pp.

International Search Report and Written Opinion, mailed on Jun. 5, 2008 for PCT/US2007/084254.

Macau Casinos Use RFID to Authenticate Chips, RFiD Journal, http//www.rfidjournal.com/article/articleprint/2878/-1/1, downloaded and printed Feb. 13, 2007.

MARS External Antenna Types, http://www.magtech.com.au/ ; downloaded and printed on Feb. 13, 2007.

GestureTek, Responsive Media, http://www.gesturetek.com; downloaded and printed on Nov. 20, 2006.

US Office Action dated Dec. 22, 2010 issued in U.S. Appl. No. 11/870,249.

US Final Office Action dated Jun. 8, 2011 issued in U.S. Appl. No. 11/870,249.

US Office Action dated Jul. 21, 2011 issued in U.S. Appl. No. 12/249,771.

US Office Action dated Sep. 26, 2011 issued in U.S. Appl. No. 12/416,611.

US Office Action dated Sep. 20, 2011 issued in U.S. Appl. No. 12/414,470.

US Office Action dated Sep. 20, 2011 issued in U.S. Appl. No. 12/414,468.

AU Examiner's first report dated Aug. 8, 2011 from Australian Patent Application No. 2007319422.

PCT International Preliminary Report on Patentability and Written Opinion dated May 11, 2010 issued in PCT/US2008/080820.

PCT International Search Report dated Dec. 29, 2009 issued in PCT/US2009/057351.

PCT International Preliminary Report on Patentability and Written Opinion dated Oct. 4, 2011 issued in PCT/US2009/057351.

PCT International Search Report dated Dec. 21, 2009 issued in PCT/US2009/057354.

PCT International Preliminary Report on Patentability and Written Opinion dated Oct. 4, 2011 issued in PCT/US2009/057354.

Identification Cards—Contactless Integrated Circuit(s) Cards—Proximity Cards—Proximity Cards —//Cartes D'Identification—Cartes A Circuit(s) Integre(s) Sans Contact—Cartes De Proximite—International Standard ISO/I EC, XX, XX, No. 14443-3, Feb. 1, 2001, pp. IVII, 01, XP001146902, paragraph [6.4.3]; figures 9, 11, 56 pages.

* cited by examiner

AUTOMATED DATA COLLECTION SYSTEM FOR CASINO TABLE GAME ENVIRONMENTS

RELATED APPLICATION DATA

The present application claims priority under 35 U.S.C. §119 to U.S. Provisional Application Ser. No. 60/858,046, naming Moser, et al. as inventors, and filed Nov. 10, 2006, the entirety of which is incorporated herein by reference in its entirety for all purposes.

BACKGROUND OF THE INVENTION

Various aspects of the present disclosure generally relate to player tracking and player rating services implemented in table game environments.

In general, casino operators have an interest in collecting the information relating to their patrons (e.g., players). Conventionally, such information may include player tracking data relating to individual player activities and/or other characteristics. As an incentive to get players to elect to have their game play activities tracked, casino operators typically offer players membership in player tracking programs which provide various rewards to the players.

Typically, player tracking programs provide rewards to players which are commensurate with each player's level of patronage (e.g., to the player's playing frequency and/or total amount of game plays at a given casino). Player tracking rewards may include free meals, free lodging and/or free entertainment. These rewards may help to sustain a game player's interest in additional game play during a visit to a gaming establishment and may entice a player to visit a gaming establishment to partake in various gaming activities.

In general, player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server.

SUMMARY OF THE INVENTION

Various embodiments may be directed to methods, systems and/or computer program products for facilitating player tracking activities at a casino gaming table. At least one embodiment may include functionality for: automatically detecting a presence of a first player at the gaming table; determining a first set of criteria relating to initiation of a player tracking session for the first player; automatically determining whether the first set of criteria has been satisfied; delaying initiation of the player tracking session for the first player in response to a determination that the first set of criteria has not been satisfied; and automatically initiating the player tracking session for the first player in response to a determination that the first set of criteria has been satisfied. In at least one embodiment, the first set of criteria may include one or more different criteria such as, for example, one or more of the following (or combinations thereof): criteria relating to detection of a player tracking device associated with the first player as satisfying specified location criteria; criteria relating to detection of the first player's location as satisfying specified location criteria; criteria relating to detection of a presence of at least one gaming chip within a wagering zone associated with the first player; criteria relating to detection of a presence of at least one gaming chip within a wagering zone associated with a specific player station at the gaming table; criteria relating to a change in at least one state of game play at the gaming table; criteria relating to detection of a continuous presence of the first player near the gaming table for a predetermined amount of time; and/or criteria relating to detection of a continuous presence of the first player's player tracking device near the gaming table for a predetermined amount of time.

Other embodiments may be directed to methods, systems and/or computer program products for facilitating player tracking activities at a casino gaming table. At least one embodiment may include functionality for: automatically detecting a presence of a first player at the gaming table; initiating a player tracking session for the first player; determining a first set of criteria relating to suspension of the player tracking session for the first player; automatically determining whether the first set of criteria has been satisfied; and automatically suspending the player tracking session for the first player in response to a determination that the first set of criteria has been satisfied. In at least one embodiment, the first set of criteria may include one or more different criteria such as, for example, one or more of the following (or combinations thereof): criteria relating to detection of an absence of a presence of the first player within a predetermined range of the gaming table; criteria relating to detection of an absence of a presence of the first player's player tracking device within a predetermined range of the gaming table; criteria relating to detection of an absence of first player gaming activity for a specified amount of time; and/or criteria relating to detection of an absence of first player wagering activity for a specified amount of time. Additionally, at least one embodiment may include functionality for: determining a second set of criteria relating to resumption of the suspended player tracking session for the first player; automatically determining whether the second set of criteria has been satisfied; and automatically resuming the suspended player tracking session for the first player in response to a determination that the second set of criteria has been satisfied.

Other embodiments may be directed to methods, systems and/or computer program products for facilitating player tracking activities at a casino gaming table. At least one embodiment may include functionality for: automatically detecting a presence of a first player at the gaming table; initiating a player tracking session for the first player; determining a first set of criteria relating to ending of the player tracking session for the first player; automatically determining whether the first set of criteria has been satisfied; and automatically ending the player tracking session for the first player in response to a determination that the first set of criteria has been satisfied. In at least one embodiment, the first set of criteria may include one or more different criteria such as, for example, one or more of the following (or combinations thereof): criteria relating to detection of an absence of a presence of the first player within a predetermined range of the gaming table; criteria relating to detection of an absence of a presence of the first player's player tracking device within a predetermined range of the gaming table; criteria relating to detection of an absence of first player gaming activity for a specified amount of time; criteria relating to detection of an absence of first player wagering activity for a specified amount of time; criteria relating to detection of the first player at a first location of the casino; and/or criteria relating to detection of the first player's player tracking device at a first location of the casino.

Other embodiments may be directed to methods, systems and/or computer program products for facilitating player rating activities at a casino gaming table. At least one embodiment may include functionality for: automatically detecting a presence of a first player at the gaming table; determining a first set of criteria relating to initiation of a player rating session for the first player; automatically determining whether the first set of criteria has been satisfied; delaying initiation of the player rating session for the first player in response to a determination that the first set of criteria has not been satisfied; and automatically initiating the player rating session for the first player in response to a determination that the first set of criteria has been satisfied.

Other embodiments may be directed to methods, systems and/or computer program products for facilitating player rating activities at a casino gaming table. At least one embodiment may include functionality for: automatically detecting a presence of a first player at the gaming table; initiating a player rating session for the first player; determining a first set of criteria relating to suspension of the player rating session for the first player; automatically determining whether the first set of criteria has been satisfied; and automatically suspending the player rating session for the first player in response to a determination that the first set of criteria has been satisfied. Additionally, at least one embodiment may include functionality for: determining a second set of criteria relating to resumption of the suspended player rating session for the first player; automatically determining whether the second set of criteria has been satisfied; and automatically resuming the suspended player rating session for the first player in response to a determination that the second set of criteria has been satisfied.

Other embodiments may be directed to methods, systems and/or computer program products for facilitating player rating activities at a casino gaming table. At least one embodiment may include functionality for: automatically detecting a presence of a first player at the gaming table; initiating a player rating session for the first player; determining a first set of criteria relating to ending of the player rating session for the first player; automatically determining whether the first set of criteria has been satisfied; and automatically ending the player rating session for the first player in response to a determination that the first set of criteria has been satisfied.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Figure 1:
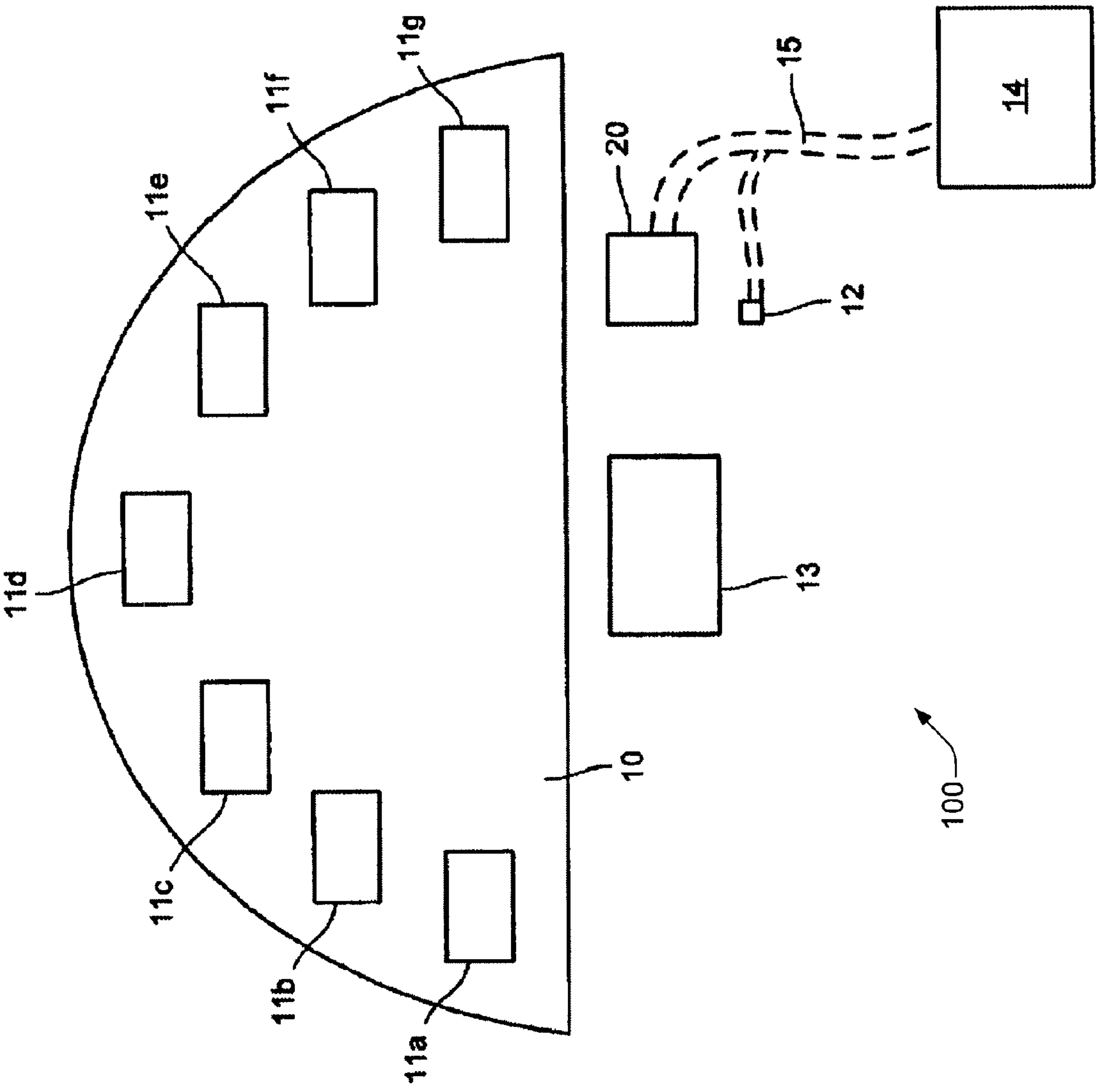
FIG. 1 shows an example of a gaming table system 100 in accordance with a specific embodiment.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

FIG. 1 shows an example of a gaming table system 100 in accordance with a specific embodiment. In the specific example of FIG. 1, gaming table 10 is illustrated as a blackjack table embodiment. However, according to different embodiments (not shown) gaming table 10 may be configured for a variety of different types of table games such as, for example, blackjack, poker, roulette, craps, baccarat, and/or other types of casino table games generally known to one having ordinary skill in the art.

As illustrated in FIG. 1, gaming table 10 includes seven player positions 11*a*-11*g*. A system for tracking play of players at the table, as well as providing information pertaining to the players, may include a media reader 12 located adjacent a dealer position 13. The media reader may be any type that is capable of reading or obtaining information from cards, media or other devices issued by the casino. For example, according to specific embodiments media reader 12 may include for example, a magnetic reader for reading magnetic stripes on cards; an electronic card reader for reading electronic cards and/or for detecting wireless signals (such as, for example RFID signals); a port for receiving electronic keys; or any combination thereof.

In an alternate embodiment (not shown), a separate media reader may be provided at each of the different player positions at gaming table 10. Each media reader may be coupled to a central computer 14 via a communication channel 15, such as, for example, cables, wires, fiber optics, wireless signals, radio waves, etc. The central computer may be operable to keep track of various information relating to the various players' accounts. Such information may include, for example, player tracking information.

Figure 2:
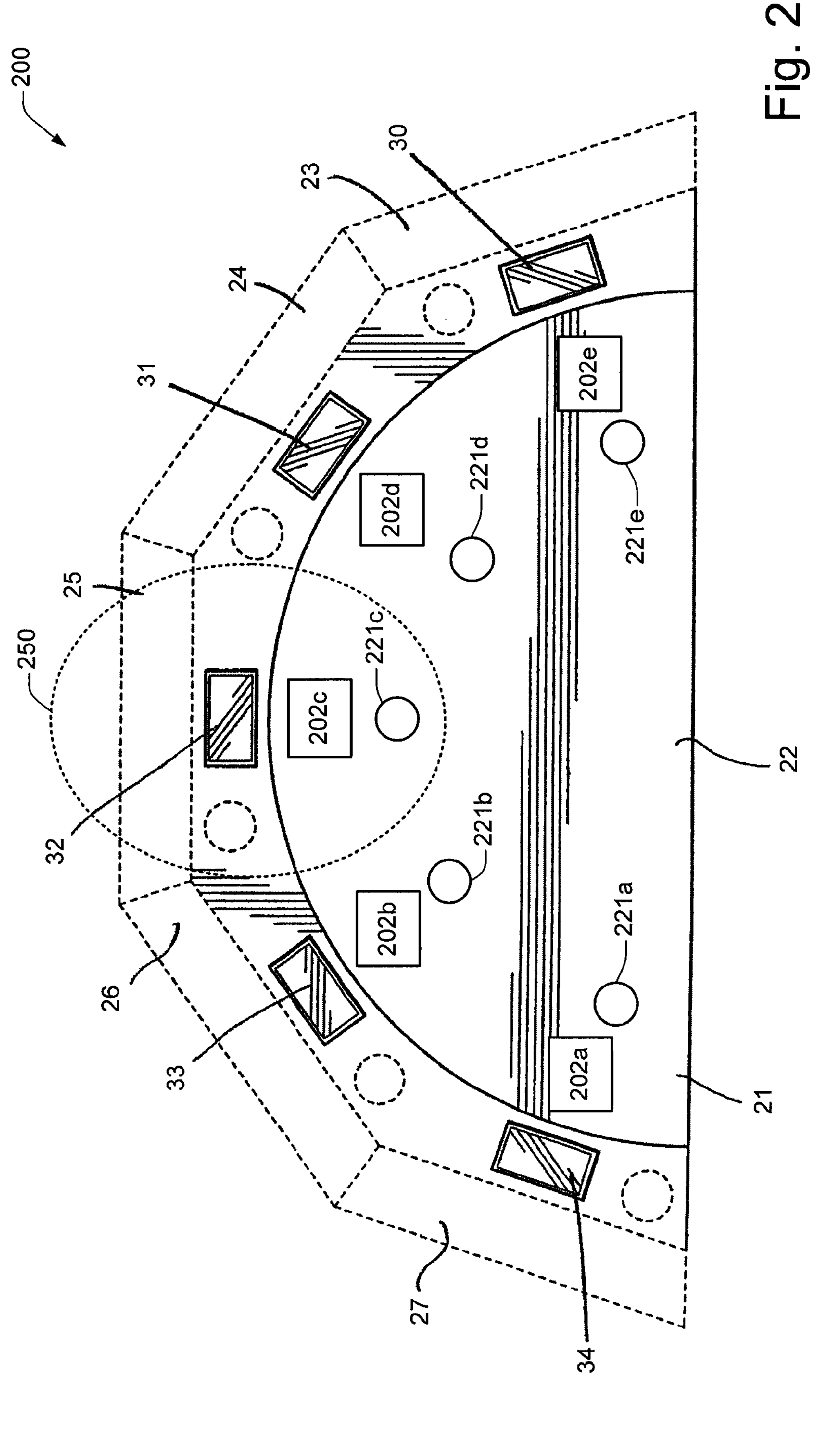
FIG. 2 shows an example of a gaming table system 200 in accordance with a different embodiment.

FIG. 2 shows an example of a gaming table system 200 in accordance with a different embodiment. As illustrated in the embodiment of FIG. 2, gaming table system 200 includes a conventionally shaped gaming table 21 for play of one or more type of table games which, for example, may include non-card based table games and/or card-based table games.

The gaming table 21 of this type is generally located in a casino or the like, and typically includes a dealer station 22, and a plurality of player stations 23-27, surrounding the dealer station. At the player stations, the players sit or stand during game play, while at the dealer station, the card dealer almost always stands. The dealer also deals the cards and takes the player's bets, on behalf of the casino, from the one more players who are participating in the table game.

As illustrated in the embodiment of FIG. 2, at least one interactive display terminal 30 is included at the gaming table 21. For example, in this particular example a respective display terminal 30-34 dedicated to each player station 23-27 at gaming table 21. According to specific embodiments, each of these interactive display terminals 30-34 may be operable to display informational content relating to advertising, player tracking information, news, etc. Additionally, each of these interactive display terminals 30-34 may be operable to allow players to access additional bonus games and/or bonus awards at each of their respective, dedicated player stations.

In at least one embodiment, the display terminals are integrated with a backend player tracking system which, for example, may be operable to manage and store various types of information including, for example, player tracking information.

According to specific embodiments, one or more of the interactive player display terminals 30-34 can be applied to deliver a variety of different types of information (e.g., advertising, news, player tracking information, bonus games, etc.) directly to the player at their respective player station 23-27. In one embodiment, one or more of the interactive player display terminals 30-34 may be operable to function as a player tracking terminal. In one embodiment, a display terminal may be operable to facilitate player access to his or her accounts via entry of personal identification numbers into a touch screen on the display.

In some embodiments, the gaming table system 200 may include one or more media reader(s) (e.g., 202*a*-*e*) capable of reading, receiving signals, and/or obtaining information from media (e.g., player tracking cards) and/or devices such as those issued by the casino. For example, as illustrated in FIG. 2, a separate media reader may be provided for each player station at gaming table 22. In at least one alternate embodiment, gaming table system 200 may include one or more media reader(s) (e.g., 202*a*-*e*), and may not include player display terminals 30-34. Thus, for example, in one such alternate embodiment, gaming table 21 may resemble a traditional live gaming table which includes felt top and not display terminals. In such an embodiment, media reader(s) (e.g., 202*a*-*e*) may be placed or located in a non-visible location such as, for example, under the gaming table top, within the body of the gaming table housing, etc.

In a specific embodiment, a media reader at gaming table system 200 may be operable to automatically detect wireless signals (e.g., 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.) from one or more wireless devices (such as, for example, an RFID-enabled player tracking card) which, for example, are in the possession of players at the gaming table. Further, the media reader may be operable to utilize the detected RFID signals to determine the identity of individual players associated with each of the different player tracking cards. The media reader may also be operable to utilize the detected RFID signals to access additional information (e.g., player tracking information) from remote servers (e.g., player tracking server). In at least one embodiment, the display terminals and/or media readers may be operated in association with player tracking networks such as those shown and disclosed in U.S. Pat. Nos. 5,665,961 and 6,319,125, each of which is incorporated herein by reference in its entirety for all purposes.

According to various embodiments, the gaming table system 200 may be used to allow a player at an associated player station (e.g., rather than the dealer or pit boss) to log in and out at one of player stations 23-27. In a specific embodiment, the display terminal associated with a player's station may be operable to function as the player's own personal player tracking kiosk right at the gaming table.

It will be appreciated that conventional techniques for monitoring player tracking activity at table games typically involve a number of manually implemented processes. For example, using conventional player tracking mechanisms, if a player wishes to initiate a player tracking session at a given table game, the player (or dealer) is typically required to manually swipe or insert the player's player tracking card into an appropriate card reader that the gaming table. Additionally, when the player desires to end the player tracking session, another manual operation must typically be performed by the player, dealer and/or other casino employee to signal to the player tracking system that the player tracking session has ended. Typically, once a player tracking session has been initiated for a player at a table game, the floor supervisor manually tracks the player's wagers and time played at the table game. Further, it will be appreciated that, historically speaking, in order to close a rating for given player tracking session, the player's walk amount information (e.g., the amount and/or value of chips that the player walked away with) must typically be manually determined and entered by the floor supervisor.

Accordingly, one aspect of the present invention is directed to different embodiments for automating the various manual processes involved in the rating of a player of a table game. Another aspect of the present invention is directed to different embodiments for automatically starting, suspending, resuming and/or ending player tracking sessions at one or more table games.

For example, according to some conventional embodiments, the starting of a player tracking session for a particular player at a table game typically occurs immediately after the player's player tracking card has been swiped or inserted into the player tracking card reader that the table game. In other conventional embodiments a player may present his player tracking card to the dealer or floor supervisor in order to initiate a player tracking session at the table game.

According to one conventional technique, the closing of an open or active player rating session for a player at a gaming table may occur as follows. The player (associated with the open player rating session) gets up and walks away from the gaming table, taking his/her chips. When the floor supervisor identifies that the player has walked, the floor supervisor will close the rating on that player, and estimate how many chips the player walked with. Accordingly, it will be appreciated that this process involves a manual and somewhat subjective mechanism, currently.

However, with the introduction of "smart" player tracking cards (such as, for example, RFID-enabled player tracking cards) and "smart" gaming table media readers such as those described herein, it is now possible for gaming table systems to automatically detect the presence of player tracking cards and to automatically determine the identities of players at the table game who are registered members of the casino's player tracking system. Such automated detection of player tracking cards and/or player identities at gaming tables introduces additional issues such as, for example, when to start, suspend and/or end a given player tracking session at the gaming table.

Accordingly, one aspect of the present invention is directed to different embodiments for detecting and interpreting various events in order, for example, to automate the starting, pausing, and/or ending of player tracking sessions at table games. Another aspect is directed to different embodiments for automatically tracking and/or determining a player's wagers and/or time played at a gaming table.

According to a specific embodiment, a "smart" player tracking card (such as, for example, a card with RFID technology embedded therein) may be used in combination with a media reader at a table game to uniquely identify a table game player, and/or to record the time a player starts playing at any position on a table. In one embodiment, a player occupying a specific seat or player station position at a gaming table may be automatically and passively detected without requiring action on the part of a player or dealer. For example, the player tracking card could be in the player's wallet when the player sits at a gaming table. Another embodiment may include a player temporarily placing his/her player card on a defined area of a table game.

Figure 8:
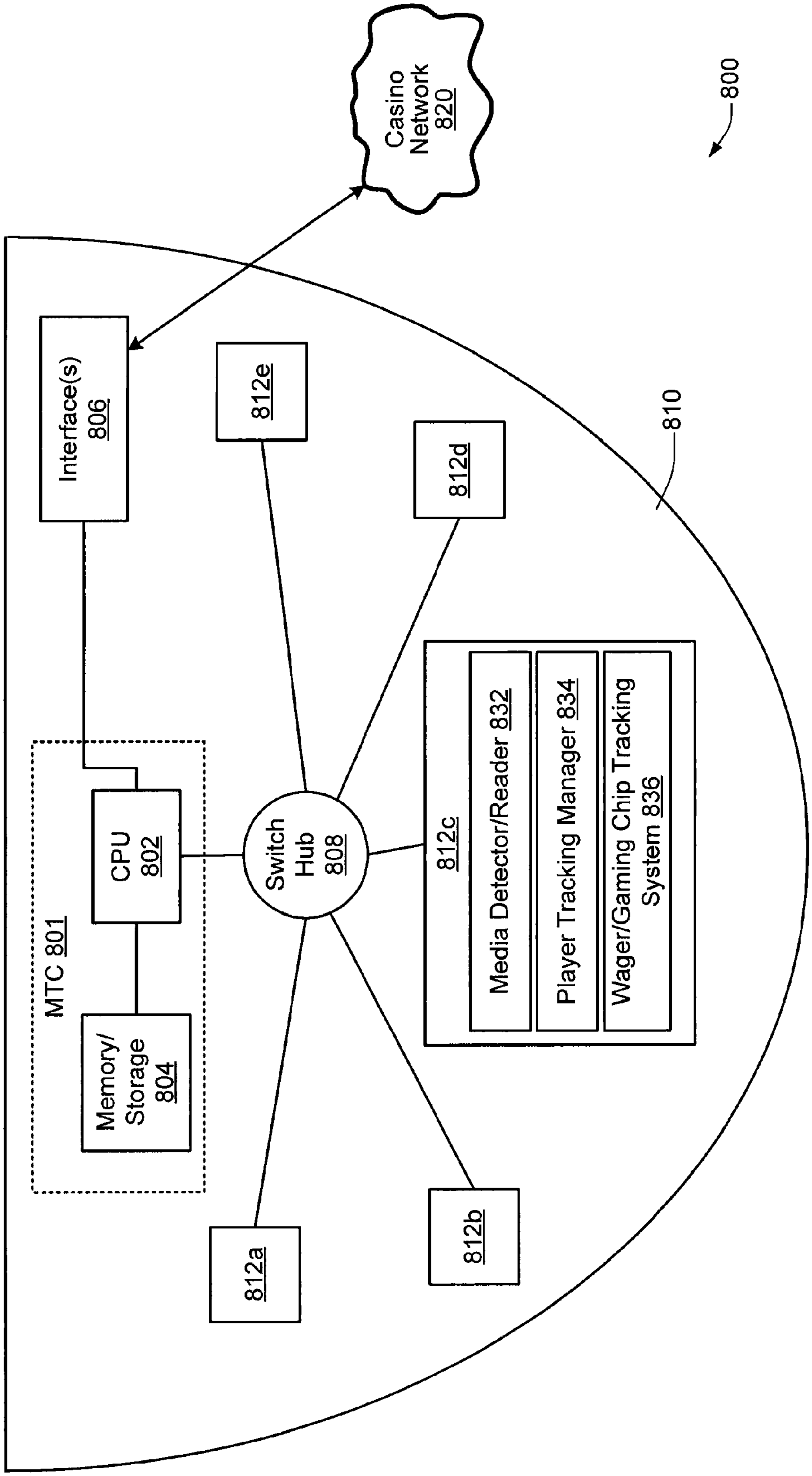
FIG. 8 is a simplified block diagram of an intelligent gaming table system 800 in accordance with a specific embodiment.

FIG. 8 is a simplified block diagram of an intelligent gaming table system 800 in accordance with a specific embodiment. As illustrated in the embodiment of FIG. 8, intelligent gaming table system 800 includes (e.g., within gaming table housing 810) a master table controller (MTC) 801, and a plurality of player station systems (e.g., 812*a-e*) which, for example, may be connected to the MTC 801 via at least one switch or hub 808. In at least one embodiment, master table controller 801 may include at least one processor or CPU 802, and memory 804. Additionally, as illustrated in the example of FIG. 8, intelligent gaming table system 800 may also include one or more interfaces 806 for communicating with other devices and/or systems in the casino network 820.

In at least one embodiment, a separate player station system may be provided at each player station at the gaming table. According to specific embodiments, each player station system may include a variety of different electronic components, devices, and/or systems for providing various types of functionality. For example, as shown in the embodiment of FIG. 8, player station system 812*c* may comprise a variety of different electronic components, devices, and/or systems including, but not limited to: a media detector/reader 832, a player tracking manager 834, a wager and/or gaming chip tracking system 836, etc. According to a specific embodiment, media detector/reader 832, player tracking manager 834, and/or wager/gaming chip tracking system 836 may each be operable to communicate with each other and/or other devices of the gaming network.

Although not specifically illustrated in FIG. 8, each of the different player station systems 812*a-e* may include components, devices and/or systems similar to that of player station system 812*c*.

According to one embodiment, media detector/reader 832 may be operable to read, receive signals, and/or obtain information from various types of media (e.g., player tracking cards) and/or other devices such as those issued by the casino. For example, media detector/reader 832 may be operable to automatically detect wireless signals (e.g., 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.) from one or more wireless devices (such as, for example, an RFID-enabled player tracking card) which, for example, are in the possession of players at the gaming table. The media detector/reader may also be operable to utilize the detected wireless signals to determine the identity of individual players associated with each of the different player tracking cards. The media detector/reader may also be operable to utilize the detected wireless signals to access additional information (e.g., player tracking information) from remote servers (e.g., player tracking server).

According to a specific embodiment, the media detector/reader may also be operable to determine the position or location of one or more players at the gaming table, and/or able to identify a specific player station which is occupied by a particular player at the gaming table.

In a specific embodiment, for example, where each player station at the gaming table includes a respective media detector/reader, each media detector/reader (e.g., 832) may be operable to detect media, devices and/or signals which are associated only with a player occupying that particular player station (e.g., player station 812*c*). Thus, for example, according to a specific embodiment, the media detector/reader associated with player station 812*c* may be operable to detect and read an RFID-enabled card held by a player occupying player station 812*c*, but may not be able to detect and/or read RFID-enabled cards held by players occupying player stations 812*a*, 812*b*, 812*d*, and/or 812*e*. Similarly, the media detector/reader associated with player station 812*b* may be operable to detect and read an RFID-enabled card held by a player occupying player station 812*b*, but may not be able to detect and/or read RFID-enabled cards held by players occupying player station 812*a*, 812*c*, 812*d*, and/or 812*e*.

In at least one embodiment, player tracking manager 834 may be operable to automatically manage various types of information, events and/or activities associated with one or more player tracking sessions at the gaming table. According to a specific embodiment, such information, events and/or activities may include, for example, but are not limited to:

- accessing information from a player's player tracking card (and/or other media);
- accessing information from a remote servers (such as, for example, a player tracking server);
- determining an identity of a player at the gaming table;
- starting a player tracking session;
- suspending a player tracking session;
- resuming a player tracking session;
- ending a player tracking session;
- recording player tracking events, activities and/or related data;
- generating or computing player tracking information;
- determining a player's walk away amount;
- determining theoretical wins;
- determining buy-ins;
- determining actual wins;
- determining player movement (e.g., a player moving from one player station at the gaming table to another);
- determining multiple ratings for a player;
- determining player skill;
- determining game speed;
- etc.

In at least one embodiment, wager/gaming chip tracking system 836 may be operable to automatically manage various types of information, events and/or activities associated gaming chips (also referred to as wagering tokens) and/or wagering activities conducted at the gaming table. According to a specific embodiment, such information, events and/or activities may include, for example, but are not limited to:

- tracking player wagering activities and/or related information;
- determining and/or tracking information relating to player buy-in activities;
- determining and/or tracking information relating to gaming chips which a player currently has in his or her possession at the gaming table (e.g., the amount and value of gaming chips within the player's personal space at the gaming table);
- determining and/or tracking information relating to a player's walk away amount;
- determining fills and/or credits;
- determine betting anomalies (e.g., including pitching and/or capping activity);
- etc.

As used herein, the terms "gaming chip" and "wagering token" may be used interchangeably, and, in at least one embodiment, may refer to a chip, coin, and/or other type of token which may be used for various types of casino wagering activities, such as, for example, gaming table wagering.

In at least one embodiment, intelligent gaming table system 800 may also include components and/or devices for implementing at least a portion of gaming table functionality described in one or more of the following patents, each of which is incorporated herein by reference in its entirety for all purposes: U.S. Pat. No. 5,735,742, entitled "GAMING TABLE TRACKING SYSTEM AND METHOD"; and U.S. Pat. No. 5,651,548, entitled "GAMING CHIPS WITH ELECTRONIC CIRCUITS SCANNED BY ANTENNAS IN GAMING CHIP PLACEMENT AREAS FOR TRACKING THE MOVEMENT OF GAMING CHIPS WITHIN A CASINO APPARATUS AND METHOD."

For example, in one embodiment, intelligent gaming table system 800 may include a system for tracking movement of gaming chips and/or for performing other valuable functions. The system may be fully automated and operable to automatically monitor and record selected gaming chip transactions at the gaming table. In one embodiment, the system may employ use of gaming chips having transponders embedded therein. Such gaming chips may be electronically identifiable and/or carry electronically ascertainable information about the gaming chip. The system may further have ongoing and/or "on-command" capabilities to provide an instantaneous or real-time inventory of all (or selected) gaming chips at the gaming table such as, for example, gaming chips in the possession of a particular player, gaming chips in the possession of the dealer, gaming chips located within a specified region (or regions) of the gaming table, etc. The system may also be capable of reporting the total value of an identified selection of gaming chips.

By way of illustration, a specific embodiment of a gaming table system may include one or more RFID readers (e.g., either directional, designated, or a combination thereof) which may be hidden from view of the players. In one embodiment, each player station or position at the table game may include a respective RFID reader which includes an antenna to detect the presence of a player's card and determine a unique identifier for the detected card. Each RFID reader may be operable to communicate the card identifier to a player tracking or rating system. According to specific embodiments, the RFID reader may also be operable to detect when the player's card is moved or removed from a particular player station or player position at the gaming table.

According to specific embodiments, different types of RFID readers may be utilized such as, for example, directional RFID readers, designated RFID readers and/or some combination thereof. For example, in one embodiment, a directional RFID reader could be used to establish a definable space that can be monitored for detecting RFID antennas which enter or exit the defined space. For example, a player carrying an RFID enabled player tracking card sits at a seat (e.g., player station) at a table game. A directional RFID reader could detect that player, and associate him/her to that particular player station. Additionally, in a specific embodiment where the RFID reader is configured as a directional RFID reader, a determination of when a player enters and leaves a seat area may be tracked.

In at least some embodiments, a designated RFID reader could be used to define a particular region on the gaming table for a player to place an RFID enabled smart card. Upon such placement, the player could be identified and associated to a particular spot/seat/player station at the gaming table. Additionally, in at least one embodiment where the RFID reader is configured as a designated RFID reader, a configurable time out may be tracked, for example, based on activity or inactivity of a particular player.

The tracked information may then be reported or communicated to a player tracking system. According to a specific embodiment, a player tracking system may be used to store various information relating to casino patrons or players. Such information (herein referred to as player tracking information) may include player rating information, which, for example, generally refers to information used by a casino to rate a given player according to various criteria such as, for example, criteria which may be used to determine a player's theoretical or comp value to a casino.

Additionally, in at least one embodiment, a player tracking session may be used to collect various types of information relating to a player's preferences, activities, game play, location, etc. Such information may also include player rating information generated during one or more player rating sessions. Thus, in at least one embodiment, a player tracking session may include the generation and/or tracking of player rating information for a given player.

Figure 5A:
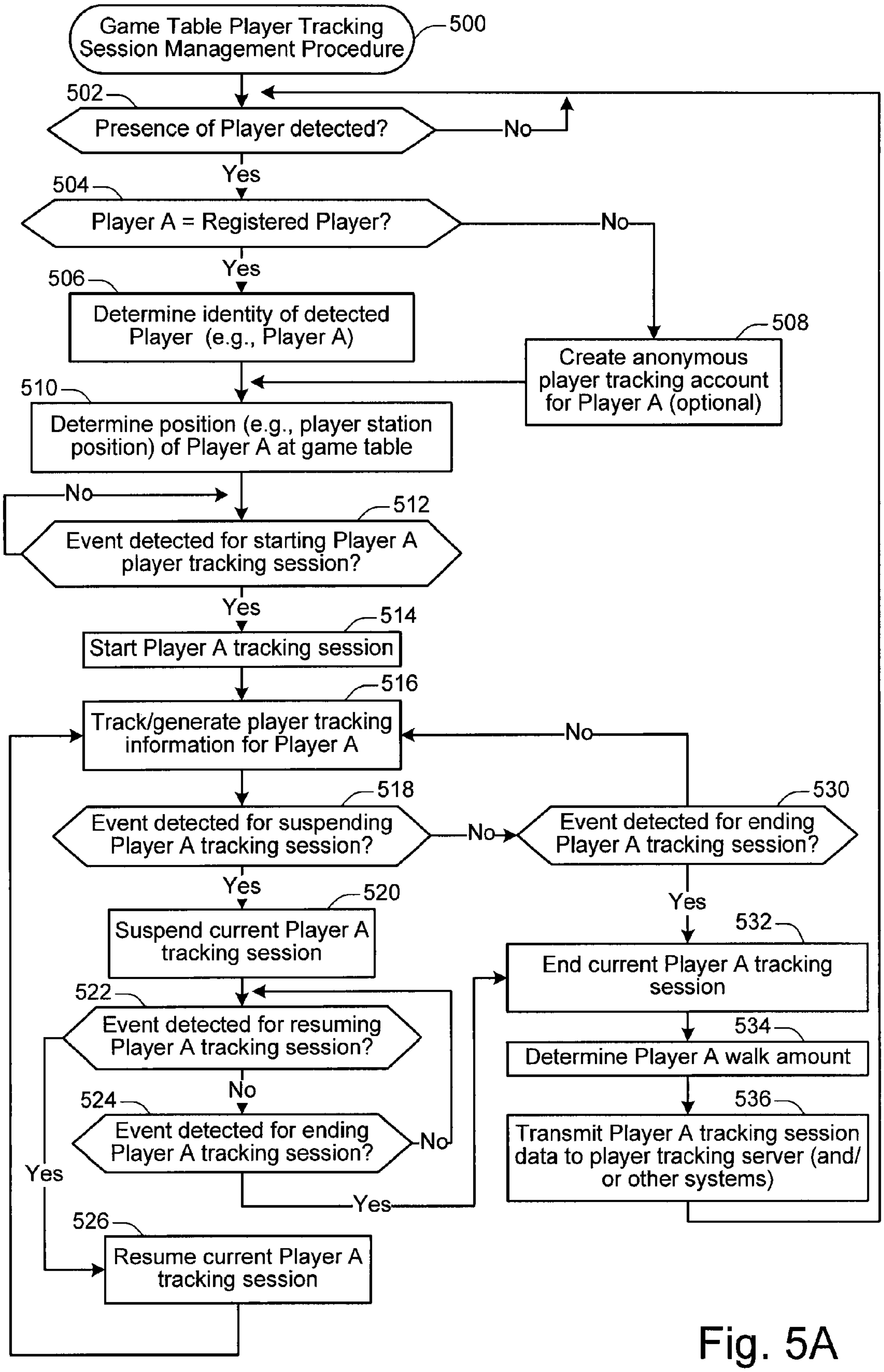
FIG. 5A shows a flow diagram of a Gaming table Player Tracking Session Management Procedure in accordance with a specific embodiment.

FIG. 5A shows a flow diagram of a Gaming Table Player Tracking Session Management Procedure in accordance with a specific embodiment. It will be appreciated that different embodiments of Gaming Table Player Tracking Session Management Procedures may be implemented at different types of table games, and may include at least some features other than or different from those described with respect to the specific embodiment of FIG. 5A.

According to specific embodiments, multiple threads of the Gaming Table Player Tracking Session Management Procedure may be simultaneously running at a given gaming table. For example, in one embodiment, a separate instance or thread of the Gaming table Player Tracking Session Management Procedure may be implemented at each player station (e.g., 23-27) of a gaming table.

For purposes of illustration, and example of the Gaming table Player Tracking Session Management Procedure 500 will now be explained with reference to gaming table system 200. According to specific embodiments, one or more gaming tables may include functionality for detecting the presence of a player at one of the gaming table's player stations. Such functionality may be implemented using a variety of different types of technologies such as, for example: cameras, pressure sensors (e.g., embedded in a seat, bumper, table top, etc.), motion detectors, image sensors, signal detectors (e.g., RFID signal detectors), dealer and/or player input devices, etc.

For example, in a specific embodiment, Player A may be carrying his/her RFID-enabled player tracking card in his/her pocket, and chose to occupy a seat at player station position 25 of gaming table system 200. Gaming table system 200 may be operable to automatically and passively detect (502) the presence of Player A, for example, by detecting an RFID signal transmitted from Player A's player tracking card. Thus, in at least one implementation, such player detection may be performed without requiring action on the part of a player or dealer.

When the presence of Player A is detected (502) at the gaming table, a determination may be made (504) as to whether Player A is a registered member of the casino's player tracking system. In one embodiment, this may be accomplished, for example, using information from Player A's player tracking card. As illustrated in the embodiment of FIG. 5A, if it is determined that Player A is a registered player tracking member, the player's identity may be determined (506). For example, Player A's player tracking card may transmit a unique identifier which may be used to look up the player's identity and/or other information in a database, such as, for example, a player tracking system database.

In other embodiments, the presence of a player may be automatically and passively detected, for example, using various types of sensors such as, for example, a motion sensor, a pressure sensor, etc. In at least some embodiments, there may be no unique signal or other information to help identify the player's identity.

According to various embodiments, if Player A's identity can not be determined, or if it is determined that Player A is not a registered member of the casino's player tracking system, an anonymous player tracking account may be created for Player A, for example, in order to allow one or more player rating sessions to be conducted for Player A at the gaming table. In a particular embodiment, during a player rating session for Player A, various player rating information may be generated for Player A, and associated with the anonymous player tracking account. Further, at one or more occasions, Player A may be given the opportunity to assign his or her identity to the anonymous player tracking account, and/or to transfer at least a portion of the generated player rating information (e.g., from the anonymous account) to a registered player tracking account.

In at least one embodiment, the gaming table may be operable to determine (510) a position of Player A at the gaming table. Thus, for example, in the present example, gaming table system 200 may be operable to determine that Player A is occupying player station 25. Such information may be subsequently used, for example, when performing player tracking operations associated with Player A.

According to different embodiments, the gaming table system may be operable to automatically initiate or start a new player tracking session for a given player (e.g., Player A) based on the detection (512) of one or more in events. For example, in one embodiment, a player tracking session for Player A may be automatically started in response to detecting the presence of the player at a given player station at the gaming table. In an alternate embodiment, a player tracking session for Player A may be automatically started upon detecting that Player A has placed his/her first wager (e.g., placed at least one gaming chip) within the player's assigned wager placement area (e.g., within the gaming chip placement circle 221*c* of FIG. 2).

It will be appreciated that a variety of different events (and/or some combination thereof) may be used to trigger the start or opening of a player tracking session for a given player. Such events may include, for example, but are not limited to, one or more of the following:

- physical proximity of player and/or player tracking device detected as satisfying predetermined criteria;
- player tracking device detected within specified zone of player station area;
- player tracking device shown or handed to dealer and/or other casino employee;
- appropriate player input detected (e.g., player pushes button);
- appropriate dealer input detected;
- specified time constraints detected as being satisfied (e.g., begin player tracking session at next round of play);
- gaming chip(s) placed detected within player's assigned wagering region;
- presence of player detected at player station;
- detection of player's first wager being placed;
- player location or position detected as satisfying predefined criteria;

- appropriate floor supervisor input detected;
- player identity determined (e.g., through the use of directional RFID; through placement of player tracking media on a designated spot at a table game; etc.);
- detection of continuous presence of player tracking media for a predetermined amount of time;
- etc.

Assuming that the appropriate event or events have been detected for starting a player tracking session for Player A, a player tracking session for Player A may then be started (514) or initiated. During the active player tracking session, player tracking information relating to Player A may be automatically tracked and/or generated (516) by one or more components of the gaming table system. According to a specific embodiment, once the player tracking session has been started, any wager and/or game play activities detected as being associated with Player A may be associated with the current player tracking session. According to specific embodiments, such player tracking information may include, but is not limited to, one or more of the following types of information (and/or some combination thereof):

- game play data;
- wager data;
- cards dealt/held/discarded;
- timestamp information;
- player station position;
- player buy-in data;
- side wager data;
- player rating data;
- session start time;
- session end time;
- cumulative time played;
- information relating to gaming chips (e.g., types, amount, value, etc.) detected as being within the player's personal player space (e.g., within personal player space region 250, FIG. 2);
- determining theoretical win information;
- determining buy-in information;
- determining actual win information;
- determining player movement information (e.g., a player moving from player station at a gaming table to another player station at the gaming table);
- determining rating information (e.g., one or more types of ratings) for a player;
- determining player skill information;
- determining game speed information;
- other player-tracking related information generally known to one having ordinary skill in the art;
- etc.

According to specific embodiments, the gaming table system may be operable to detect one or more events relating to the suspension and/or ending of an active player session. For example, in one embodiment, the gaming table system may periodically check for events relating to the suspension and/or ending of an active player session. Alternatively, a separate or asynchronous process (e.g., an event detection manager/component) may be utilized for detecting various events such as, for example, those relating to the starting, suspending, resuming, and/or ending of one or more player tracking sessions at the gaming table.

As shown in the embodiment of FIG. 5A, if an event is detected (518) for suspending Player A's active player tracking session, the current or active player tracking session for Player A may be suspended (e.g., temporarily suspended). In one embodiment, during a suspended player tracking session, no additional player tracking information is tracked or generated for that player.

According to specific embodiments, a variety of different events may be used to trigger the suspension of a player tracking session for a given player. Such events may include, for example, but are not limited to, one or more of the following (and/or some combination thereof):

- no detection of player at assigned player station;
- no detection of player's player tracking device within predetermined range;
- player input;
- dealer input;
- time based events;
- player detected as not being within predetermined range;
- no player activity with specified time period;
- player determined to be out of gaming chips;
- etc.

For example, if a player inadvertently removes his/her player tracking device from a designated location of the gaming table for a brief period of time, and/or for a predetermined number of rounds, and the player tracking device is subsequently returned to its former location, the gaming table system may be operable to merge consecutive periods of activity into the same player tracking session, including any rounds tracked while the player's player tracking device was detected as being absent. In one embodiment, if a player moves to a different player station at the gaming table, the gaming table system may respond by switching or modifying the player station identity associated with that player's player tracking session in order to begin tracking information associated with the player's player tracking session at the new player station.

In at least one embodiment, a suspended player tracking session may be resumed or ended, depending upon the detection of one or more appropriate events. For example, as shown in the example of FIG. 5A, if an event is detected for resuming (522) the suspended Player A player tracking session, the player tracking session for Player A may be resumed (526) and/or re-activated, whereupon player tracking information relating to Player A may be automatically tracked and/or generated (516) by one or more components of the gaming table system.

According to specific embodiments, a variety of different events may be used to trigger the resuming of a player tracking session for a given player. Such events may include, for example, but are not limited to, one or more of the following (and/or some combination thereof):

- re-detection of player at assigned player station;
- re-detection of player's player tracking device within predetermined range;
- player input;
- dealer input;
- time based events;
- player detected as being within predetermined range;
- player game play activity detected;
- player wager activity detected;
- etc.

Alternatively, if an event is detected for ending (524) the suspended Player A player tracking session, the player tracking session for Player A may be ended (532) and/or closed. At that point the player tracking manager (e.g., 834) may have (and/or may be able to calculate) all desired player wager information such as, for example, turnover, average wager, theoretical value, comp value, etc.

According to specific embodiments, a variety of different events may be used to trigger the ending of a player tracking session for a given player. Such events may include, for example, but are not limited to, one or more of the following (and/or some combination thereof):

- no detection of player at assigned player station;
- no detection of player's player tracking device within predetermined range;
- player input;
- dealer input;
- time based events;
- player detected as not being within predetermined range;
- no player activity with specified time period;
- player determined to be out of gaming chips;
- timeout exceeded;
- player detected at another location in the casino;
- player tracking device detected at another location in the casino;
- etc.

According to a specific embodiment, the closing of the Player A player tracking session at the gaming table may include operations relating to the closing of a Player A rating session, which, in turn, may include determining a current walk amount for Player A. For example, in one embodiment, the gaming table system may include one or more components for detecting gaming chips (e.g., belonging to a particular player) within a predetermined region or zone at the gaming table which, for example, may be defined as that player's personal space. For example, as illustrated in the embodiment of FIG. 2, player station 25 has associated therewith a personal space region 250.

In at least one embodiment, each player station at the gaming table may have associated therewith its own unique personal player space region. In one embodiment, a wager/gaming chip tracking system (e.g., 836, FIG. 8) may be operable to automatically identify and track the number and/or values of gaming chips which are located within a player's personal space at the gaming table and/or which are located at other locations at the gaming table, such as, for example, non-wagering areas of the gaming table. In at least one embodiment, such functionality allows the tracking of player gaming chips on the table at all times, and not just when a wager is made. Additionally, in at least one embodiment, such functionality allows the tracking of player gaming chips in non-wagering regions of the gaming table (e.g., such as, for example, regions other than the specifically designated wagering areas). For example, it may be used to automatically determine the amount and/or value of gaming chips which a player walked with, for example, based on the removal of chips from the player's personal space. It may also be used to automatically track player buy-in information, for example, based on the adding of new chips to the player's personal space and/or other criteria (e.g., chips awarded to the player due to a win at the gaming table are not counted or included). Accordingly, it will be appreciated that such functionality may help eliminate delays in closing a player rating session which traditionally have been associated with manual processes.

Automation of Player Rating Sessions at Gaming Tables

Various techniques described herein may be used to automatically determine a player's wagers and time played at a gaming table. For example, as described herein, different player tracking mechanisms may be used to detect the presence and/or location of a player (and/or presence and location of a player's electronic player tracking card or other wireless device(s) associate with that player) within the casino. Additionally, different player tracking mechanisms may also be used to detect the presence, absence and/or location of a player (and/or presence and location of a player's electronic player tracking card or other wireless device(s) associate with that player) at one or more casino gaming tables. In at least one embodiment, at least a portion of such player tracking information may be provided to a player rating system to be used in performing automated player rating activities associated with the player.

For example, according to different embodiments, an automated player rating system may be operable to use at least a portion of the player tracking information (and/or other desired information, events and/or criteria as described herein) to automatically start, stop, pause and/or resume player rating session(s) associated with a given player.

In at least one embodiment, various distinctions may be made between player tracking session information and player rating session information. For example, in one embodiment, player tracking session information may include a variety of different information generally relating to locations and/or activities of players in different regions of a casino. Such activities may include gaming and/or non-gaming related player activities. In one embodiment, for example, a single player rating session may include generating, monitoring, tracking and/or recording information relating to a variety of different player gaming (and/or non-gaming) activities which may occur (e.g., for a given player) at different gaming stations, gaming tables and/or gaming machines at the casino. Thus, for example, in one embodiment, a single player tracking session for a given player may include information relating to the player's gaming activities at multiple different gaming tables. In at least one embodiment, such player tracking session information may include player rating information relating to the player's gaming activities at the different gaming tables.

In at least one embodiment, player tracking information may be characterized as a subset of player tracking information. For example, in at least one embodiment, player rating information may be used to track and/or evaluate a player's skill level, ranking, and/or comp value to the casino. In at least one embodiment, player tracking information may include at least a portion of such player rating information, but may also include other information which may be used to characterize a player's preferences, habits, non-gaming activities, interests, etc.

In one embodiment, player rating information may include a variety of different information generally relating to a player gaming activities at a given gaming table, gaming station and/or gaming machine. Moreover, in at least one embodiment, a separate player rating session for a given player may be initiated and used to track player rating information relating to the player's gaming activities at each different gaming table visited by the player. Thus, for example, in one embodiment where a player may engage in gaming activities at three different casino gaming tables, three different player rating session may be initiated for that player, wherein each player rating session may be used to track the player's gaming activities at respective gaming table visited by the player.

Figure 5B:
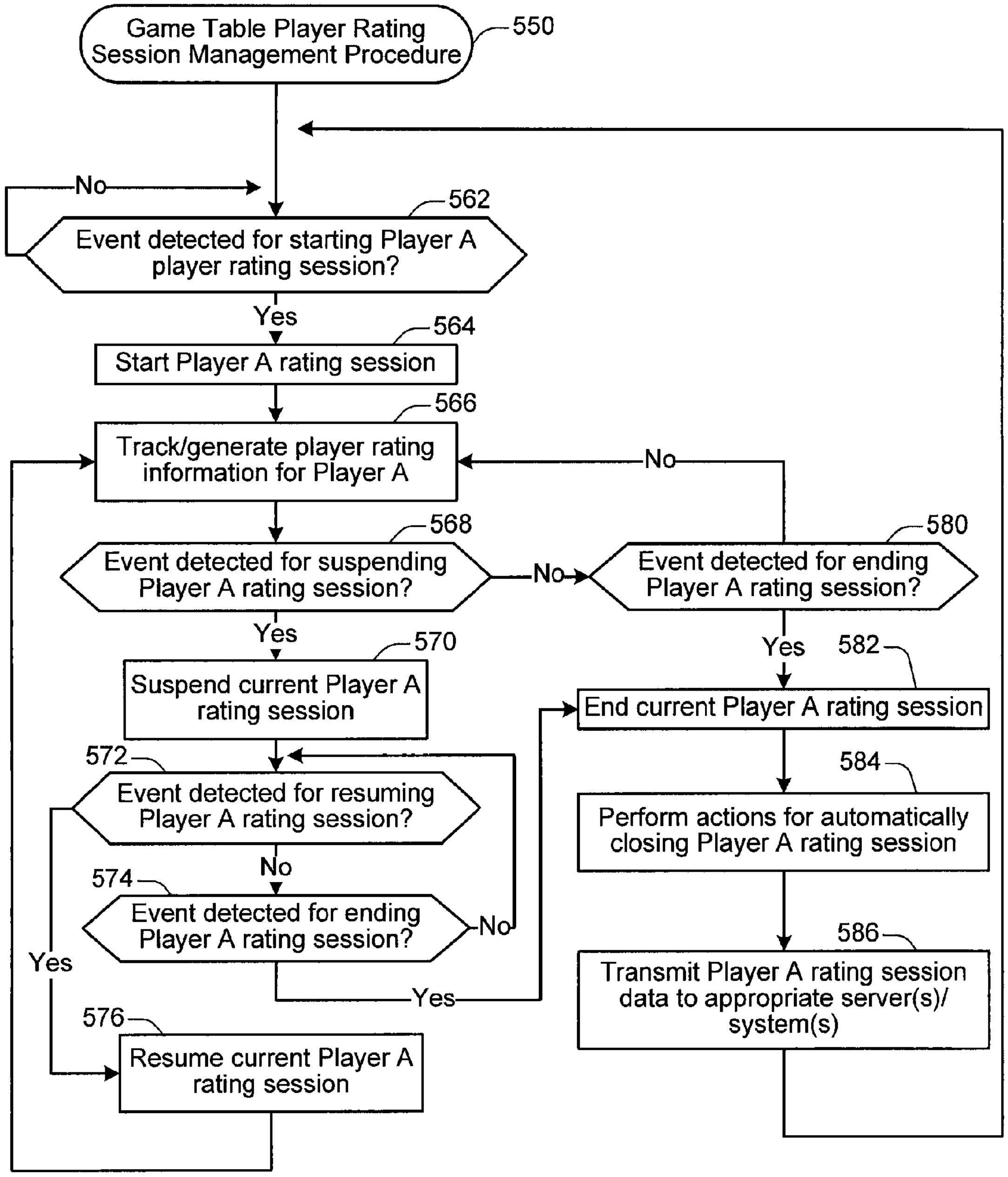
FIG. 5B shows a flow diagram of a Gaming Table Player Rating Session Management Procedure in accordance with a specific embodiment.

FIG. 5B shows a flow diagram of a Gaming Table Player Rating Session Management Procedure in accordance with a specific embodiment. It will be appreciated that different embodiments of Gaming table Player Rating Session Management Procedures may be implemented at different types of table games, and may include at least some features other than or different from those described with respect to the specific embodiment of FIG. 5B.

According to specific embodiments, multiple threads of the Gaming Table Player Rating Session Management Procedure may be simultaneously running at a given gaming table. For example, in one embodiment, a separate instance or thread of the Gaming table Player Rating Session Management Procedure may be implemented for each player (or selected players) of a given gaming table.

For purposes of illustration, and example of the Gaming Table Player Rating Session Management Procedure 550 will now be explained with reference to gaming table system 200. According to specific embodiments, one or more gaming tables may include functionality for detecting the presence of a player at one of the gaming table's player stations. Such functionality may be implemented using a variety of different types of technologies such as, for example: cameras, pressure sensors (e.g., embedded in a seat, bumper, table top, etc.), motion detectors, image sensors, signal detectors (e.g., RFID signal detectors), dealer and/or player input devices, etc.

For example, in a specific embodiment, Player A may be carrying his/her RFID-enabled player tracking card in his/her pocket, and chose to occupy a seat at player station position 25 of gaming table system 200. Gaming table system 200 may be operable to automatically and passively detect the presence of Player A, for example, by detecting an RFID signal transmitted from Player A's player tracking card. Thus, in at least one implementation, such player detection may be performed without requiring action on the part of a player or dealer.

In at least one embodiment, the gaming table may be operable to determine a position of Player A at the gaming table. Thus, for example, in the present example, gaming table system 200 may be operable to determine that Player A is occupying player station 25. Such information may be subsequently used, for example, when performing player rating operations associated with Player A.

According to different embodiments, the gaming table system may be operable to automatically initiate or start a new player rating session for a given player (e.g., Player A) based on the detection (562) of one or more in events. For example, in one embodiment, a player rating session for Player A may be automatically started in response to detecting the presence of the player at a given player station at the gaming table. In an alternate embodiment, a player rating session for Player A may be automatically started upon detecting that Player A has placed his/her first wager (e.g., placed at least one gaming chip) within the player's assigned wager placement area (e.g., within the gaming chip placement circle 221*c* of FIG. 2).

According to specific embodiments, a variety of different conditions, events and/or some combination thereof may be used to trigger the start or opening of a player rating session for a given player. Such events may include, for example, but are not limited to, one or more of the following:

- physical proximity of player and/or player tracking device detected as satisfying predetermined criteria;
- player tracking device detected within specified zone of player station area;
- player tracking device shown or handed to dealer and/or other casino employee;
- appropriate player input detected (e.g., player pushes button);
- appropriate dealer input detected;
- specified time constraints detected as being satisfied (e.g., begin player rating session at next round of play);
- gaming chip(s) placed detected within player's assigned wagering region;
- presence of player detected at player station;
- detection of player's first wager being placed;
- player location or position detected as satisfying predefined criteria;
- appropriate floor supervisor input detected;
- player identity determined (e.g., through the use of directional RFID; through placement of player tracking media on a designated spot at a table game; etc.);
- detection of continuous presence of player tracking media for a predetermined amount of time;
- etc.

For example, in one embodiment wherein player tracking may be implemented using an RFID-enabled player tracking card (or RFID-enabled device), the player rating system may automatically start a player rating for the player using the time, position and/or card identifier information associated with the RFID-enabled player tracking. In one embodiment, the player rating system may determine the player's identity using the card identifier information. In another embodiment, the player rating system may determine the player's identity by requesting desired information from a player management system. In one embodiment, once the rating has been started, any (or selected) wager activities performed by the player may be automatically tracked and associated with that player's rating.

Assuming that the appropriate event or events have been detected (562) for starting a player rating session for a given player (e.g., Player A), a player rating session for Player A may then be started or initiated (564). During the active player rating session, player rating information relating to Player A may be automatically tracked and/or generated by one or more components of the gaming table system. According to a specific embodiment, once the player tracking session has been started, all or selected wager and/or game play activities detected as being associated with Player A may be associated with the current player rating session for Player A. According to specific embodiments, such player rating information may include, but is not limited to, one or more of the following types of information (and/or some combination thereof):

- wager data;
- timestamp information;
- player station position;
- player buy-in data;
- side wager data;
- session start time;
- session end time;
- information relating to gaming chips (e.g., types, amount, value, etc.) detected as being within the player's personal player space (e.g., within personal player space region 250, FIG. 2);
- player movement information (e.g., a player moving from player station at a gaming table to another player station at the gaming table);
- rating information (e.g., one or more types of ratings) for a player;
- player skill information;
- game speed information;
- various types of player-tracking related information;
- amounts wagered;
- time played;
- game speed (e.g., wagers/hour);
- house advantage;
- walk amount;
- actual wins/losses;
- theoretical wins/losses;
- net session win/loss;
- winnings;
- buy-in activity (e.g., using chips, cash, marker, vouchers, credits, etc.);
- marker in activity;
- time spent at gaming table;
- active gaming time spent at gaming table;

chips out activity;
redemption activity (e.g., pay offs using credits and/or markers, buying back of credits/markers);
comp. value information (e.g., a value or rating for a player which may be used by the casino for awarding various complimentary products, services, etc. for a given player and/or for given time period);
player ranking information (e.g., bronze, silver, gold);
etc.

According to specific embodiments, the gaming table system may be operable to detect (568) one or more events relating to the suspension and/or ending of an active player rating session. For example, in one embodiment, the gaming table system may periodically check for events relating to the suspension and/or ending of an active player rating session. Alternatively, a separate or asynchronous process (e.g., an event detection manager/component) may be utilized for detecting various events such as, for example, those relating to the starting, suspending, resuming, and/or ending of one or more player rating sessions at the gaming table.

In at least one embodiment, if an event is detected for suspending Player A's active player rating session, the current or active player rating session for Player A may be suspended (570) (e.g., temporarily suspended). In one embodiment, during a suspended player rating session, no additional player rating information is logged or tracked for that player.

According to specific embodiments, a variety of different events may be used to trigger the suspension of a player rating session for a given player. Such events may include, for example, but are not limited to, one or more of the following (and/or some combination thereof):

no detection of player at assigned player station;
no detection of player's player tracking device within predetermined range;
player input;
dealer input;
other casino employee input (e.g., pit boss, etc.)
time based events;
player detected as not being within predetermined range;
no player activity with specified time period;
player determined to be out of gaming chips;
etc.

For example, if a player inadvertently removes his/her player tracking device from a designated location of the gaming table for a brief period of time, and/or for a predetermined number of rounds, and the player tracking device is subsequently returned to its former location, the gaming table system may be operable to merge consecutive periods of activity into the same player rating session, including any rounds tracked while the player's player tracking device was detected as being absent. In one embodiment, if a player moves to a different player station at the gaming table, the gaming table system may respond by switching or modifying the player station identity associated with that player's player rating session in order to begin tracking information associated with the player's player rating session at the new player station.

In at least one embodiment, a suspended player rating session may be resumed or ended, depending upon the detection of one or more appropriate events. For example if an event is detected (572) for resuming the suspended Player A player rating session, the player rating session for Player A may be resumed (576) and/or re-activated, whereupon player tracking information relating to Player A may be automatically tracked and/or generated by one or more components of the gaming table system.

According to specific embodiments, a variety of different events may be used to trigger the resuming of a player rating session for a given player. Such events may include, for example, but are not limited to, one or more of the following (and/or some combination thereof):

re-detection of player at assigned player station;
re-detection of player's player tracking device within predetermined range;
player input;
dealer input;
other casino employee input (e.g., pit boss, etc.)
time based events;
player detected as being within predetermined range;
player game play activity detected;
player wager activity detected;
etc.

Alternatively, if an event is detected for ending (580) the suspended Player A player rating session, the player rating session for Player A may be ended (582) and/or automatically closed (584). At that point the player tracking manager (e.g., 834) may have (and/or may be able to automatically calculate) all desired player wager information such as, for example, turnover, average wager, theoretical value, comp value, etc.

According to specific embodiments, a variety of different events may be used to trigger the closing of a player rating session for a given player. Such events may include, for example, but are not limited to, one or more of the following (and/or some combination thereof):

no detection of player at assigned player station;
no detection of player's player tracking device within predetermined range;
player input;
dealer input;
other casino employee input (e.g., pit boss, etc.)
time based events;
player detected as not being within predetermined range;
no player activity with specified time period;
player determined to be out of gaming chips;
timeout exceeded;
player detected at another location in the casino;
player tracking device detected at another location in the casino;
etc.

According to a specific embodiment, the closing of the Player A player rating session may include determining a current walk amount for Player A. For example, in one embodiment, the gaming table system may include one or more components for detecting gaming chips (e.g., belonging to a particular player) within a predetermined region or zone at the gaming table which, for example, may be defined as that player's personal space. For example, as illustrated in the embodiment of FIG. 2, player station 25 has associated therewith a personal space region 250. In at least one embodiment, each player station at the gaming table may have associated therewith its own unique personal player space region. In one embodiment, a wager/gaming chip tracking system (e.g., 836, FIG. 8) may be operable to automatically identify and track the number and values of gaming chips which are located within a player's personal space at the gaming table.

According to various embodiments, different mechanisms may be used to identify and track the number and values of gaming chips which are located within a player's personal space at the gaming table. For example, in at least one embodiment, one or more video cameras and intelligent image analysis software may be used to identify and/or track at least a portion gaming chips which are located within a player's personal space at the gaming table. In some embodiments where at least a portion of the player's gaming chips are RFID-enabled gaming chips, tracking of the movements and/or locations of the gaming chips may be accomplished, for example, using various types of RFID device tracking mechanisms such as, for example, RFID device tracking mechanisms well known in the art, and/or other types of RFID device tracking mechanisms such as those disclosed, for example, in U.S. patent application Ser. No. 11/726,633, entitled Radio Direction Finder for Gaming Chip and/or Player Tracking, by Mattice et al., filed Mar. 21, 2007, the entirety of which is herein incorporated by reference for all purposes.

In at least one embodiment, such gaming chip tracking functionality allows the tracking of player gaming chips on the table at all or desired times, and not just when a wager is made. For example, it may be used to automatically determine the amount and/or value of gaming chips which a player walked with, for example, based on the removal of chips from the player's personal space. It may also be used to automatically track player buy-in information, for example, based on the adding of new chips to the player's personal space and/or other criteria (e.g., chips awarded to the player due to a win at the gaming table are not counted or included). Accordingly, it will be appreciated that such functionality may help eliminate delays in closing a player rating session which traditionally have been associated with manual processes.

Other Intelligent Gaming Table System Embodiments

Figure 3:
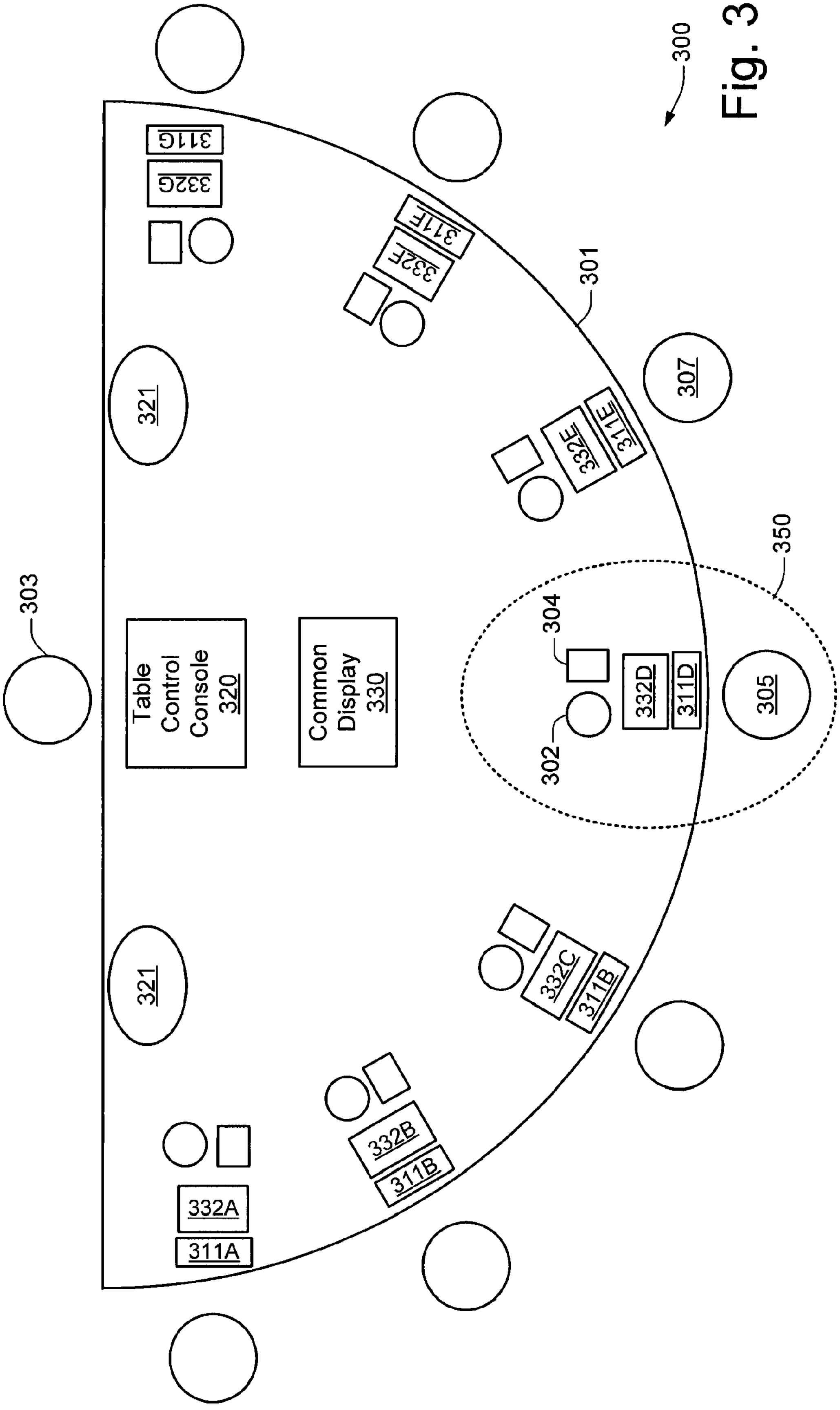
FIG. 3 shows an example of a specific embodiment of an intelligent gaming table system 300.

FIG. 3 shows an alternate example of a specific embodiment of an intelligent gaming table system 300. As illustrated in the example of FIG. 3, a casino gaming table environment 300 is displayed which includes intelligent gaming table 301, dealer 303, and players (e.g., 305, 307). In this particular embodiment, the intelligent gaming table 301 includes a plurality of electronic displays (e.g., 312A-G, 310). In one embodiment, the plurality of electronic displays may be implemented as separate physical displays which have been mounted into (or onto) the body of a conventional-type casino gaming table. In an alternate embodiment, the entire top surface (or selected portions thereof) of the intelligent gaming table may be implemented as a continuous display, and the electronic displays (e.g., 312A-G, 310) implemented as specific display regions within the continuous display. Other embodiments of the intelligent gaming table of the present invention may resemble conventional-type casino gaming tables which do not include any electronic displays.

According to specific embodiments, the intelligent gaming table 301 can be of a variety of common constructions. For example, table 301 may include a table support trestle having legs which contact an underlying floor to support the intelligent gaming table thereon. The intelligent gaming table may have a table top and perimeter pad which extends fully about a semicircular portion of the table periphery. The straight, back portion of the periphery is used by the dealer 303 and can be partly or wholly padded as may vary with the particular table chosen.

A playing surface is provided upon the upwardly facing surface of table top upon which participants of the card game play. A plurality of players (e.g., 305) sit or stand along the semicircular portion and play a desired card game, such as the popular casino card game of blackjack. Other card games are alternatively possible, although the system described herein is specifically adapted for playing casino blackjack.

Although not shown in the example of FIG. 3, the intelligent gaming table 301 may also include a gaming chip rack which allows the dealer to conveniently store gaming chips used by the dealer in playing the game. A money drop slot may be further included to allow the dealer to easily deposit paper money bills thereinto when players purchase gaming chips.

Table 301 can support a system, or form a part of a system for playing card games which is constructed according to specific embodiments of the present invention.

As illustrated in the example of FIG. 3, the intelligent gaming table may include a table control console 320 for use by the dealer and/or other casino employees. In one implementation, the table control console may be used to facilitate and execute game play operations, table configuration operations, player tracking operations, maintenance and inspection operations, etc.

Further, as illustrated in the example of FIG. 3, the intelligent gaming table may include a which is adapted to display images that depict the cards and card hands being played along with additional information used in the play of the card game. For example, as shown in the example of FIG. 3, the intelligent gaming table 301 includes a plurality of electronic displays (e.g., 312A-G, 310). In one embodiment, the plurality of electronic displays may be implemented as separate physical displays which have been mounted into (or onto) the body of a conventional-type casino gaming table. In an alternate embodiment, the entire top surface (or selected portions thereof) of the intelligent gaming table may be implemented as a continuous display, and the electronic displays (e.g., 312A-G, 310) implemented as specific display regions within the continuous display. Other embodiments of the intelligent gaming table of the present invention may resemble conventional-type casino gaming tables which do not include any electronic displays.

According to a specific embodiment, the presentation system or display units may be supported upon the upper or playing surface 55 of the intelligent gaming table. This allows the system to be easily installed upon a variety of differing intelligent gaming tables without extensive modifications being performed. Alternatively, the presentation system can otherwise be mounted upon the intelligent gaming table in a manner which allows participants to view one or more of the displays which form a part of the presentation system.

According to a specific embodiment, the presentation system may be adapted for use by a dealer 303 and multiple players (e.g. 305) who are in attendance and positioned about the intelligent gaming table.

As illustrated in the example of FIG. 3, the intelligent gaming table may optionally include one or more speakers 321 which, for example, may be used to provide various types of audio information such as, for example: game related information (e.g., instructions to players and/or dealer, sound effects, etc.), casino related announcements, gaming table status information, music, attracts, promotions, bonus information, communication information (e.g., for speakerphone or two-way radio communications), etc.

According to specific embodiments, the intelligent gaming table may include a plurality of electronic displays (e.g., 312A-G), herein termed player displays, which are capable of displaying changeable display images. The player display images are intended to display graphical representations of playing cards (e.g., virtual playing cards) and/or other information used in the play of the card game.

Additionally, as shown, for example, in FIG. 3, the intelligent gaming table may include one or more common displays (e.g., Common Display 310) which may present information for the exclusive use of the dealer and/or other information to be viewed by the dealer, players, spectators, and/or other persons. Various types of information which may be displayed at the common display 310 include, for example:

dealer cards, ante information, common or shared player cards, individual player cards, wager information, etc. In one embodiment, the common display 310 may be used to:

- reveal cards of selected players (when appropriate);
- verify cards dealt to selected players;
- display the dealer's cards;
- display game play instructions;
- display table configuration information;
- display player tracking related information;
- display player tracking session status information;
- display error messages;
- display wagering information;
- indicate which of the players is currently playing (e.g., show active player);
- display active players' actions (e.g., Hit, Hold, Double Down);
- display promotional information;
- identify players waiting for an opening at the table (e.g., next up);
- display community cards;
- display bonus game;
- display progressive jackpots;
- display multimedia information from external sources;
- etc.

Player displays 312 may be arranged adjacent to each player seating position. For example, player display 312D may be adapted for use by player 305, and player display 312E may be adapted for use by player 307.

In at least one embodiment, the intelligent gaming table displays may include touchscreen functionality for facilitating user interaction. For example, the player displays 312 may include a touchscreen and/or other input mechanisms for allowing the player to provide input relating to game play, preferences, wagering, player tracking activity, etc.

In at least one implementation, the intelligent gaming table may include one or more sensors (e.g., 311A-G) or other security mechanisms which, for example, may be used for a variety of purposes such as, for example, controlling the display of a player's cards; preventing accidental exposure of player cards; providing additional security features with respect to information displayed on the player's display; etc.

For example, in one embodiment, a pressure sensor may be provided to the control the display of a player's cards. In this particular embodiment, a player may be required to apply pressure on the pressure sensor in order to cause the player's cards to be display. In one of limitation, a velocity pressure sensor may be utilized to allow for more of the player's display information to be displayed in response to an increase in pressure on the pressure sensor, and to allow for less of the player's display information to be displayed in response to a decrease in the pressure on the pressure sensor.

In a different embodiment, a light sensor may be provided to the control the display of a player's cards. For example, in one implementation, the player's cards may be displayed in response to the light sensor detecting a predefined decrease in the amount of ambient light detected near the display such as, for example, in the situation where the player cups his or her hands over their player display.

In another embodiment, a heat sensor may be provided to the control the display of a player's cards. For example, in one implementation, the player's cards may be displayed in response to the heat sensor detecting a predefined increase in the amount of thermal heat detected near the display such as, for example, in the situation where the player cups his or her hands over their player display.

In another embodiment, a scrolling wheel or other mechanism may be provided to the control the display of a player's cards. For example, in one implementation, the player's cards may be gradually displayed in response to the player rotating the scrolling wheel in a first direction, and may be gradually hidden in response to the player rotating the scrolling wheel in a second (e.g., opposite) direction.

Other security mechanisms for controlling the display of information on a player's display may include, for example:

- biometric identification devices (e.g., fingerprint reader);
- use of player tracking cards and/or player tracking profile information;
- a "display cards" button;
- implementing a time delay before showing cards after receiving input to display cards;
- limiting viewing angle of player display so that only the player in front of the display can view the display;
- etc.

As illustrated in the example of FIG. 3, the intelligent gaming table 301 may include player wagering zones or gaming chip placement zones (e.g., 302). In one embodiment, each player wagering zone may include a gaming chip detection component which may be adapted to automatically detect the presence and/or monetary amount of gaming chips which have been placed within a player's wagering zone. In at least one implementation, a player must position a gaming chip within their respective wagering zone to be considered a participant in the game being played.

One aspect of the present invention relates to a method and apparatus for graphically representing and displaying casino game play data (e.g., player cards, dealer cards, etc.), player tracking related information, and/or other desired data on a mobile or handheld display device.

In at least one implementation, a respective personal player device (herein referred to as a PPD, e.g., 450 of FIG. 4) may be provided to each player at the intelligent gaming table for facilitating various activities such as, for example: game play activities, player tracking activities and/or other activities conducted at the intelligent gaming table or elsewhere. Associations may be made between PPDs and players (and/or player positions at the intelligent gaming table) such that each PPD is uniquely associated with a respective player (and/or player position) at the intelligent gaming table.

Figure 6:
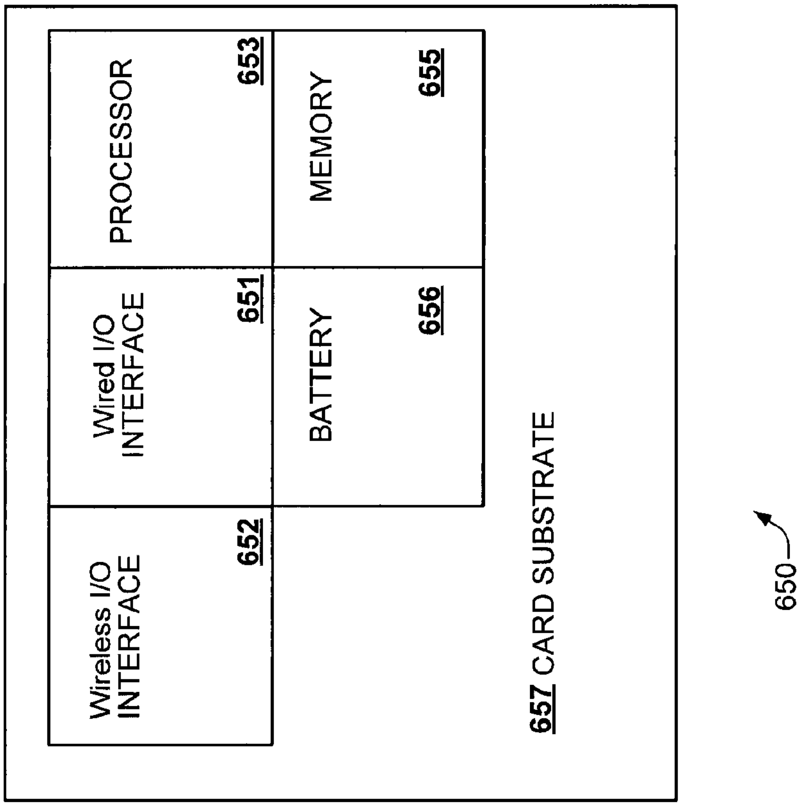
FIG. 6 illustrates a block diagram of the components of a smart card 650 that may be used in the present invention.

In one embodiment, the PPD may be implemented as a simple player tracking card such as, for example, an RFID-enabled player tracking card such as that illustrated in FIG. 6 of the drawings.

FIG. 6 illustrates a block diagram of the components of a smart card 650 that may be used in the present invention. The RF enabled smart card may be designed for wired or wireless use with a gaming machine, gaming peripheral, gaming terminal, gaming table, and/or use with tracking units situated in non-gaming sections of the casino. In one embodiment, the smart card 650 may have the same footprint as a magnetic striped card and may include a wired input/output interface 651, a wireless input/output interface 652, a processor 653, memory 655 and a battery 656 incorporated in some manner on a card substrate 657. The battery 656 is used to supply power to operate the devices on the smart card 650. In some embodiments, when it is inserted into a smart card reader of some type, power may also be supplied to the card by the smart card reader.

The smart card 650 may include an operating system of some type that is used to run applications on the smart card. In some embodiments, the operating system for the smart card 650 may be provided by Microsoft (Redmond, Wash.) or Sun Microsystems of Palo Alto, Calif. The operating system may be used to manage the execution of gaming applications on the smart card. The operating system and gaming applications may incorporated into the processor 653 as firmware, stored in the memory 655 on the smart card or may be implemented as a combination of firmware in the processor 653 and stored in the memory 655. The processor 653 may be a general purpose microprocessor or a custom microcontroller incorporating gaming specific firmware. The memory 655 may be flash memory.

The wired Input/output interface 651 may be an I/O EEPROM or the like that allows the smart card 650 to communicate with a smart card reader and/or other types of media readers. Further, the I/O interface 651 may include one or more communication protocols that allow the smart card 650 to communicate directly with gaming machines, gaming peripherals, gaming terminal, gaming tables and/or other gaming devices designed to communicate with the smart card. Some communication protocols may be stored in the memory 655 of the smart card 650. The communication protocols stored in the memory 655 may be added or deleted from the smart card 650 as needed.

According to a specific embodiment, the wireless Input/output or Input interfaces may be provided by a wireless smart card reader which permits the smart card 650 to communicate with non-gaming activity player tracking units and/or the gaming activity player tracking units such as those on a gaming machine, gaming peripheral, gaming terminal, gaming table, etc. This wireless I/O interface may include one or more wireless communication protocols, such as the wireless communication standard Bluetooth™ described above, that allow the smart card 650 to communicate with the corresponding wireless smart card reader. Some communication protocols may be stored in the memory 655 of the smart card 650, and may be added or deleted from the smart card 50 as needed.

In alternate embodiments, the PPD may correspond to a player's PDA, cell phone, and/or other handheld computing device. As explained in greater detail below, a PPD may be adapted to perform a variety of functions such as, for example, one or more of the following:

- allowing a player to select cards for discard/holding;
- allowing a player to perform wagering activities (e.g., increasing bets, checking bets, performing side wagering/backbetting activities, etc.);
- initiating or starting a player tracking session;
- suspending a player tracking session;
- resuming a player tracking session;
- merging data from one or more player tracking sessions;
- ending a player tracking session;
- initiating, suspending or ending a flat rate play session;
- retrieving and/or displaying player tracking data;
- retrieving and/or displaying player account data;
- displaying game play assistance information;
- displaying casino layout information;
- displaying promotional information;
- displaying multimedia information from external sources such as TV signals;
- notify a player of messages;
- displaying player's current location;
- etc.

Figure 7:
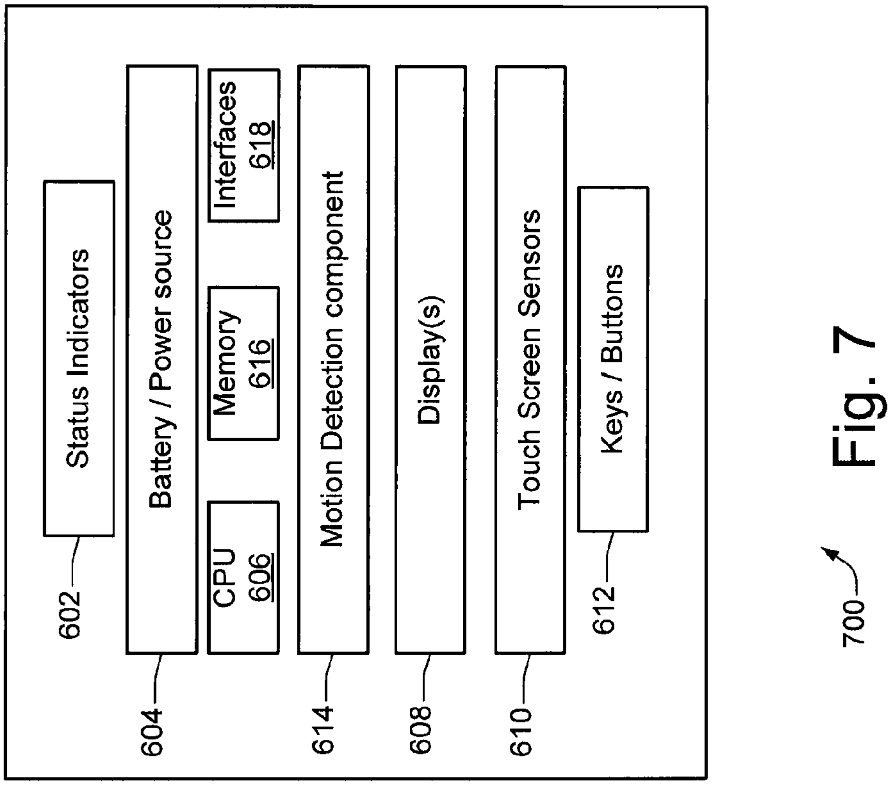
FIG. 7 shows a simplified block diagram of various components which may be used for implementing a personal player device (PPD) in accordance with the specific embodiment.

FIG. 7 shows a simplified block diagram of various components which may be used for implementing a PPD device in accordance with the specific embodiment of the present invention.

As illustrated in the example of FIG. 7, PPD 700 may include a variety of components, modules and/or systems for providing functionality relating to one or more aspects of the present invention. Other PPD embodiments of the present invention (not shown) may include different or other components than those illustrated in FIG. 7. For example, PPD 700 may include one or more of the following:

- At least one processor or CPU (706). In at least one implementation, the processor(s) 706 may include at least some functionality similar to processor(s) 410 of FIG. 4.
- Memory 716, which, for example, may include volatile memory (e.g., RAM), non-volatile memory (e.g., disk memory, FLASH memory, EPROMs, etc.), unalterable memory, and/or other types of memory. In at least one implementation, the memory 716 may include at least some functionality similar to memory 416 of FIG. 4.
- Interface(s) 718 which, for example, may include wired interfaces and/or wireless interfaces. In at least one implementation, the interface(s) 718 may include functionality similar to interface(s) 406 of FIG. 4. For example, in at least one implementation, the wireless communication interface(s) may be configured or designed to communicate with components of the intelligent gaming table (such as, for example, PPD docking regions), remote servers, electronic gaming machines, other wireless devices (e.g., PDAs, other PPDs, cell phones, player tracking transponders, etc.). Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.
- At least one power source 704. In at least one implementation, the power source may include at least one mobile power source for allowing the PPD to operate in a mobile environment. For example, in one implementation, the battery 704 may be implemented using a rechargeable, thin-film type battery. Further, in embodiments where it is desirable for the PPD to be flexible, the battery 704 may be designed to be flexible.
- One or more display(s) 708. According to various embodiments, such display(s) may be implemented using, for example, LCD display technology, OLED display technology, and/or other types of conventional display technology. In at least one implementation, display(s) 708 may be adapted to be flexible or bendable. Additionally, in at least one embodiment the information displayed on display(s) 708 may utilize e-ink technology (such as that available from E Ink Corporation, Cambridge, Mass., www.eink.com), or other suitable technology for reducing the power consumption of information displayed on the display(s) 708.
- One or more user I/O Device(s) such as, for example, touch keys/buttons 712, scroll wheels, cursors, touchscreen sensors 710, etc.
- One or more status indicators 702. For example, in one implementation, one or more colored status indicators (such as, for example, LEDs) may be included on the back portion of a PPD (e.g., the side opposite the display 708), and adapted to provide various information such as, for example: communication status; game play status; player tracking session status; flat rate play session status; bonus status; PPD health status; PPD operating mode; battery power status; battery charging status; status of cards being dealt; "ok to pickup PPD" status; error detection status; team status; out of range status; etc.
- At least one motion detection component 714 for detecting motion or movement of the PPD and/or for detecting motion, movement, gestures and/or other input data from user.

Although not illustrated in FIG. 7, other PPD embodiments of the present invention may include fewer or additional components, modules and/or systems such as, for example:

- Device driver(s) which, for example, may include at least some functionality similar to device driver(s) 242 of FIG. 2.
- Authentication/validation components which, for example, may be used for authenticating and/or validating local hardware and/or software components and/or hardware/software components residing at a remote device. In at least one implementation, the authentication/validation component(s) may include functionality similar to authentication/validation component(s) 244 of FIG. 2.
- Geolocation module which, for example, may be configured or designed to acquire geolocation information from remote sources and use the acquired geolocation information to determine information relating to a relative and/or absolute position of the PPD. For example, in one implementation, the geolocation module may be adapted to receive GPS signal information for use in determining the position or location of the PPD. In another implementation, the geolocation module may be adapted to receive multiple wireless signals from multiple remote devices (e.g., gaming machines, servers, wireless access points, etc.) and use the signal information to compute position/location information relating to the position or location of the PPD.
- User Identification module. In one implementation, the User Identification module may be adapted to determine the identity of the current user or owner of the PPD. For example, in one embodiment, the current user may be required to perform a log in process at the PPD in order to access one or more features. Alternatively, the PPD may be adapted to automatically determine the identity of the current user based upon one or more external signals such as, for example, an RFID tag or badge worn by the current user which provides a wireless signal to the PPD for determining the identity of the current user. In at least one implementation, various security features may be incorporated into the PPD to prevent unauthorized users from accessing confidential or sensitive information.
- Information filtering module(s) which, for example, may be adapted to automatically and dynamically generate, using one or more filter parameters, filtered information to be displayed on the PPD display(s). In one implementation, such filter parameters may be customizable by the player or PPD user.
- Speakers or other audio output components.
- Media presentation modules such as, for example, components for displaying audio/visual media.
- Etc.

For example, in one implementation, a PPD may be adapted to communicate with a remote server to access player account data, for example, to know how much funds are available to the player for wagering.

In at least one implementation, the PPD may also include other functionality such as that provided by PDAs, cell phones, or other mobile computing devices. Further, in at least one implementation, the PPD may be adapted to automatically and/or dynamically change its functionality depending on various conditions such as, for example: type of game being played; user input; current location or position; detection of local electronic gaming tables/devices; etc.

In at least one embodiment, a PPD may be implemented using conventional mobile electronic devices (e.g., PDAs, cell phones, etc.) which have been specifically adapted to implement at least a portion of the PPD functionalities described herein.

In one embodiment, the intelligent gaming table may adapted to electronically "deal" cards to each of the players at the intelligent gaming table, and to store information relating to each player's hand on each player's corresponding PPD. In at least one implementation, a player is able to view the cards of his or her hand on a display of that player's PPD.

According to a specific embodiment, the PPD may also be adapted to implement at least a portion of the features associated with other mobile devices such as those described, for example, in one or more of the following references, each of which being incorporated herein by reference in its entirety for all purposes: U.S. patent application Ser. No. 11/472,585 entitled "MOBILE DEVICE FOR PROVIDING FILTERED CASINO INFORMATION BASED ON REAL TIME DATA"; U.S. patent application Ser. No. 30/062,002 for "GAMING SYSTEM AND GAMING METHOD."

Returning to the example of FIG. 3, the intelligent gaming table 301 may include a plurality of PPD docking regions (e.g., 304). In one implementation, a separate PPD docking region is provided at each player station at the intelligent gaming table. According to various embodiments, a PPD docking region may include appropriate hardware and/or software for implementing a variety of functions or features such as, for example:

- performing PPD detection, authentication, and/or identification;
- providing wired or wireless communication with selected PPDs;
- providing unidirectional or bidirectional communication with selected PPDs;
- providing power and/or battery charging capabilities to selected PPDs;
- reconfiguring PPDs;
- updating PPD software;
- downloading new games;
- reading player selections;
- generating player tracking related information;
- etc.

In at least one embodiment, the PPD docking regions may be part of a casino gaming network which, for example, may include one or more of: intelligent gaming table systems, electronic gaming machines, game servers, player tracking servers, casino accounting servers, and/or other component(s) with which communication may be desired. The PPD docking regions may also be adapted to provide at least one communication interface for allowing selected PPDs to communicate with desired components/systems of the casino gaming network.

In at least one embodiment, the PPDs and/or PPD docking regions may include one or more communication interfaces for facilitating communication with each other. Such communication interfaces may have a variety of architectures and utilize a variety of protocols such as, for example, USB, IEEE-1394 (FireWire™), Ethernet, etc. (e.g., in cases where the communication link is a wired link), or one or more wireless links utilizing one or more wireless protocols such as, for example: 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

It will be appreciated that, in other embodiments, various combinations of PPDs and player displays may be used. For example, in some embodiments of the intelligent gaming tables of the present invention, all playing card related activity may be implemented using PPDs. In at least some of these embodiments, the player displays (e.g., 312A-G) may be used to display desired information to the player (e.g., other than the player's cards) such as, player tracking information, player tracking session status information; wagering information, game rules, side wagering activities/information, other game play activities/information (e.g., keno, sports book wagering, etc.), etc. In other embodiments of the intelligent gaming table, the player displays (e.g., 312A-G) may be omitted.

In at least one implementation, a dealer at a intelligent gaming table may have access to multiple PPDs which have not been yet been activated or registered to a particular player. When a new player desires to participate in the game being played at the intelligent gaming table, the dealer may select a PPD for activation, activate the PPD for game play and/or player tracking functionality, and hand the activated PPD over to the new player.

A variety of different security-related features may be implemented at the intelligent gaming table in order, for example, to address various issues such as player cheating, PPD tampering, unwanted or accidental viewing of player's cards, unauthorized use of player tracking or account data, etc.

For example, in at least one implementation, a PPD must first be activated and/or undergo a registration process before being allowed to be used for game play at the intelligent gaming table.

In one embodiment, a player may possess his or her own PPD which has been registered for that player's exclusive use. For example, the PPD may be registered and linked to the player's player tracking account. In at least one implementation, the player may carry his PPD with him and use his PPD for game play at any authorized intelligent gaming table. In one implementation, before a player-owned PPD is enabled for use at the intelligent gaming table, a security check may be performed to authenticate and/or validate the PPD before authorizing it for use at the intelligent gaming table, in order to help ensure that the PPD has not been modified or tampered.

According to different embodiments, a PPD may also be linked to a specific PPD docking region (e.g., 304) which is associated with a specific player station (e.g., 350) at the intelligent gaming table. For example, in one implementation, before game play begins, a player at player station 350 may be required to place his or her PPD within that station's PPD docking region 304. In an alternate embodiment, one or more sensors or components at the player station may automatically detect the presence of a PPD within a predetermined range or distance (e.g., within region 350). For example, if a player with a PPD in her pocket sits down at seat 305 of player station 350, the intelligent gaming table may automatically detect the presence of the PPD and associate it's location with player station 350.

According to a specific embodiment, once the game play begins, a pairing mechanism may be established between the player's PPD and PPD docking region 304. In one implementation, such pairing mechanism may result in the PPD being unable to communicate with any other PPD docking region at the intelligent gaming table during the game play (e.g., until the current round of game play has ended), and may also result in the PPD docking region 304 being unable to communicate with any other PPD during the game play. Such pairing mechanisms may help prevent other players (and/or persons near the intelligent gaming table) from being able to gain access to unauthorized game play data (such as, for example, cards dealt to other players at the intelligent gaming table).

Another security measure which may be implemented relates to a PPD function control mechanism which may be adapted to prevent a PPD from performing certain functions and/or from displaying selected information based on the occurrence of various conditions.

For example, in one implementation, the PPD may be adapted to allow for the display of the player's cards only when the PPD is within an allowable "PPD display zone" such as, for example, a predetermined distance (e.g., within 5 feet) from the intelligent gaming table and/or associated PPD docking region. If the PPD is moved to a location outside of the allowable display zone, the PPD display may be cleared and/or disabled. In another embodiment, an active player tracking session for a player at the gaming table may be suspended in response to detecting that the player's PPD is not within a predetermined range from the gaming table and/or associated PPD docking region.

According to a specific embodiment, one mechanism for implementing such security features is via the use of near-field magnetic communication technology. For example, in one implementation, at least one communication channel between a PPD and its associated PPD docking station may be implemented using a near-field communication protocol which has been adapted to allow a bidirectional communication between the PPD and the PPD docking station within a range of up to 5 feet. The PPD may be adapted to require that this communication channel remain active in order to continue the active player tracking session for that player (and/or to perform other specified functions). When the PPD is moved to a location more than 5 feet from the PPD docking station, the near-field communication channel will go down, and in response, the PPD may be adapted implement one or more appropriate responses such as, for example, suspending or ending the active player tracking session. When the PPD is moved to a location within 5 feet from the PPD docking station, the near-field communication channel may be re-established, and in response, the PPD may be adapted to implement one or more other appropriate responses such as, for example, resuming a suspended player tracking session, merging data from one or more player tracking sessions, initiating a new player tracking session, etc.

An example of a near-field communication protocol is the ECMA-340 "Near Field Communication—Interface and Protocol (NFCIP-1)", published by ECMA International (www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 4 devices using such wireless communication protocols.

It will be appreciated that intelligent gaming table 301 is but one example from a wide range of intelligent gaming table designs on which the present invention may be implemented. For example, not all suitable intelligent gaming tables have electronic displays or player tracking features. Further, some intelligent gaming tables may include a single display, while others may include multiple displays. Other intelligent gaming tables may not include any displays. As another example, a game may be generated on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from gaming environments may be displayed on portable gaming devices that are used to facilitate game play activities at the intelligent gaming table. Further an intelligent gaming table or server may include gaming logic for commanding a remote gaming device to render an image from a virtual camera in 2-D or 3-D gaming environments stored on the remote gaming device and to display the rendered image on a display located on the remote gaming device. Thus, those of skill in the art will understand that the present invention, as described below, can be deployed on most any intelligent gaming table now available or hereafter developed.

Some preferred intelligent gaming tables of the present assignee are implemented with special features and/or additional circuitry that differentiates them from general-purpose computers (e.g., desktop PC's and laptops). Intelligent gaming tables are highly regulated to ensure fairness and, in some cases, intelligent gaming tables may be operable to dispense monetary awards. Therefore, to satisfy security and regulatory requirements in a gaming environment, hardware and software architectures may be implemented in intelligent gaming tables that differ significantly from those of general-purpose computers. A description of intelligent gaming tables relative to general-purpose computing machines and some examples of the additional (or different) components and features found in intelligent gaming tables are described below.

At first glance, one might think that adapting PC technologies to the gaming industry would be a simple proposition because both PCs and intelligent gaming tables employ microprocessors that control a variety of devices. However, because of such reasons as 1) the regulatory requirements that are placed upon intelligent gaming tables, 2) the harsh environment in which intelligent gaming tables operate, 3) security requirements and 4) fault tolerance requirements, adapting PC technologies to an intelligent gaming table can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in an intelligent gaming table because in an intelligent gaming table these faults can lead to a direct loss of funds from the intelligent gaming table, such as stolen cash or loss of revenue when the intelligent gaming table is not operating properly.

For the purposes of illustration, a few differences between PC systems and gaming systems will be described. A first difference between intelligent gaming tables and common PC based computers systems is that some intelligent gaming tables may be designed to be state-based systems. In a state-based system, the system stores and maintains its current state in a non-volatile memory, such that, in the event of a power failure or other malfunction the intelligent gaming table will return to its current state when the power is restored. For instance, if a player was shown an award for a table game and, before the award could be provided to the player the power failed, the intelligent gaming table, upon the restoration of power, would return to the state where the award is indicated. As anyone who has used a PC, knows, PCs are not state machines and a majority of data is usually lost when a malfunction occurs. This requirement affects the software and hardware design on an intelligent gaming table.

A second important difference between intelligent gaming tables and common PC based computer systems is that for regulation purposes, various software which the intelligent gaming table uses to generate table game play activities (such as, for example, the electronic shuffling and dealing of cards) may be designed to be static and monolithic to prevent cheating by the operator of intelligent gaming table. For instance, one solution that has been employed in the gaming industry to prevent cheating and satisfy regulatory requirements has been to manufacture an intelligent gaming table that can use a proprietary processor running instructions to generate the game play activities from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game play activities, such as adding a new device driver used by the master table controller to operate a device during generation of the game play activities can require a new EPROM to be burnt, approved by the gaming jurisdiction and reinstalled on the intelligent gaming table in the presence of a gaming regulator. Regardless of whether the EPROM solution is used, to gain approval in most gaming jurisdictions, an intelligent gaming table must demonstrate sufficient safeguards that prevent an operator or player of an intelligent gaming table from manipulating hardware and software in a manner that gives them an unfair and some cases an illegal advantage. The intelligent gaming table should have a means to determine if the code it will execute is valid. If the code is not valid, the intelligent gaming table must have a means to prevent the code from being executed. The code validation requirements in the gaming industry affect both hardware and software designs on intelligent gaming tables.

A third important difference between intelligent gaming tables and common PC based computer systems is the number and kinds of peripheral devices used on an intelligent gaming table are not as great as on PC based computer systems. Traditionally, in the gaming industry, intelligent gaming tables have been relatively simple in the sense that the number of peripheral devices and the number of functions the intelligent gaming table has been limited. Further, in operation, the functionality of intelligent gaming tables were relatively constant once the intelligent gaming table was deployed, i.e., new peripherals devices and new gaming software were infrequently added to the intelligent gaming table. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on an intelligent gaming table, intelligent gaming tables still have unique device requirements that differ from a PC, such as device security requirements not usually addressed by PCs. For instance, monetary devices, such as coin dispensers, bill validators and ticket printers and computing devices that are used to govern the input and output of cash to an intelligent gaming table have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in intelligent gaming tables that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer may be used in International Game Technology (IGT) intelligent gaming tables to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Intelligent gaming tables of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

One method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed has been stored. This feature allows the game to recover operation to the current state of play in the event of a malfunction, loss of power, etc that occurred just prior to the malfunction. In at least one embodiment, the gaming machine is configured or designed to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

In order to ensure the success of atomic transactions relating to critical information to be stored in the gaming machine memory before a failure event (e.g., malfunction, loss of power, etc.), it is preferable that memory be used which includes one or more of the following criteria: direct memory access capability; data read/write capability which meets or exceeds minimum read/write access characteristics (such as, for example, at least 5.08 Mbytes/sec (Read) and/or at least 38.0 Mbytes/sec (Write)). Devices which meet or exceed the above criteria may be referred to as "fault-tolerant" memory devices, whereas it is which the above criteria may be referred to as "fault non-tolerant" memory devices.

Typically, battery backed RAM devices may be configured or designed to function as fault-tolerant devices according to the above criteria, whereas flash RAM and/or disk drive memory are typically not configurable to function as fault-tolerant devices according to the above criteria. Accordingly, battery backed RAM devices are typically used to preserve gaming machine critical data, although other types of non-volatile memory devices may be employed. These memory devices are typically not used in typical general-purpose computers.

Thus, in at least one embodiment, the gaming machine is configured or designed to store critical information in fault-tolerant memory (e.g., battery backed RAM devices) using atomic transactions. Further, in at least one embodiment, the fault-tolerant memory is able to successfully complete all desired atomic transactions (e.g., relating to the storage of gaming machine critical information) within a time period of 200 milliseconds (ms) or less. In at least one embodiment, the time period of 200 ms represents a maximum amount of time for which sufficient power may be available to the various gaming machine components after a power outage event has occurred at the gaming machine.

As described previously, the gaming machine may not advance from a first state to a second state until critical information that allows the first state to be reconstructed has been atomically stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Thus, for example, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the intelligent gaming table and the state of the intelligent gaming table (e.g., credits) at the time the table game was played. The game history information may be utilized in the event of a dispute. For example, a player may decide that in a previous table game that they did not receive credit for an award that they believed they won. The game history information may be used to reconstruct the state of the intelligent gaming table prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of intelligent gaming tables, such as IGT gaming computers, is that they often include unique interfaces, including serial interfaces, to connect to specific subsystems internal and external to the intelligent gaming table. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the intelligent gaming table, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from an intelligent gaming table to a remote device. Often SAS is used in conjunction with a player tracking system.

IGT intelligent gaming tables may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT intelligent gaming table by monitoring security switches attached to access doors in the intelligent gaming table cabinet. Preferably, access violations result in suspension of game play and can trigger additional security operations to preserve the current state of game play. These circuits also function when power is off by use of a battery backup. In power-off operation, these circuits continue to monitor the access doors of the intelligent gaming table. When power is restored, the intelligent gaming table can determine whether any security violations occurred while power was off, e.g., via software for reading status registers. This can trigger event log entries and further data authentication operations by the intelligent gaming table software.

Trusted memory devices and/or trusted memory sources are preferably included in an IGT intelligent gaming table computer to ensure the authenticity of the software that may be stored on less secure memory subsystems, such as mass storage devices. Trusted memory devices and controlling circuitry are typically designed to not allow modification of the code and data stored in the memory device while the memory device is installed in the intelligent gaming table. The code and data stored in these devices may include authentication algorithms, random number generators, authentication keys, operating system kernels, etc. The purpose of these trusted memory devices is to provide gaming regulatory authorities a root trusted authority within the computing environment of the intelligent gaming table that can be tracked and verified as original. This may be accomplished via removal of the trusted memory device from the intelligent gaming table computer and verification of the secure memory device contents is a separate third party verification device. Once the trusted memory device is verified as authentic, and based on the approval of the verification algorithms included in the trusted device, the intelligent gaming table is allowed to verify the authenticity of additional code and data that may be located in the gaming computer assembly, such as code and data stored on hard disk drives. A few details related to trusted memory devices that may be used in the present invention are described in U.S. Pat. No. 6,685,567, filed Aug. 8, 2001 and titled "Process Verification," and U.S. patent application Ser. No. 11/221,314, filed Sep. 6, 2005, each of which is incorporated herein by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities. Details of zero knowledge proofs that may be used with the present invention are described in US publication no. 2003/0203756, by Jackson, filed on Apr. 25, 2002 and entitled, "Authentication in a Secure Computerized Gaming System", which is incorporated herein in its entirety and for all purposes.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "SECURED VIRTUAL NETWORK IN A GAMING ENVIRONMENT", naming Nguyen et al. as inventors, filed on Mar. 10, 2005, herein incorporated in its entirety and for all purposes.

Mass storage devices used in a general purpose computer typically allow code and data to be read from and written to the mass storage device. In an intelligent gaming table environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Figure 4:
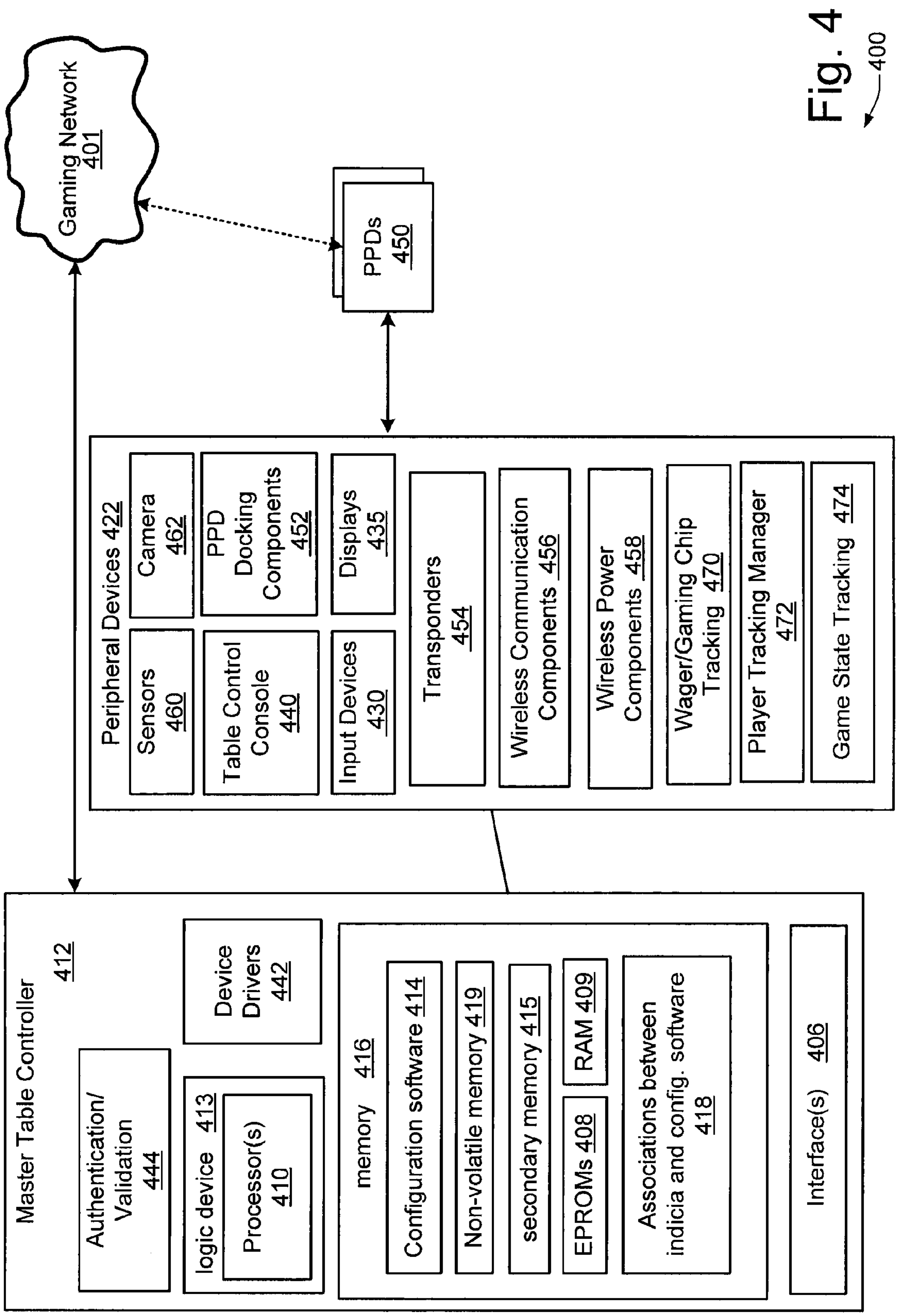
FIG. 4 is a simplified block diagram of an exemplary intelligent gaming table system 400 in accordance with a specific embodiment.

FIG. 4 is a simplified block diagram of an exemplary intelligent gaming table system 400 in accordance with a specific embodiment. As illustrated in the embodiment of FIG. 4, intelligent gaming table system 400 includes at least one processor 410, at least one interface 406, and memory 416.

In one implementation, processor 410 and master table controller 412 are included in a logic device 413 enclosed in a logic device housing. The processor 410 may include any conventional processor or logic device configured to execute software allowing various configuration and reconfiguration tasks such as, for example: a) communicating with a remote source via communication interface 406, such as a server that stores authentication information or games; b) converting signals read by an interface to a format corresponding to that used by software or memory in the intelligent gaming table; c) accessing memory to configure or reconfigure game parameters in the memory according to indicia read from the device; d) communicating with interfaces, various peripheral devices 422 and/or I/O devices; e) operating peripheral devices 422 such as, for example, card readers, paper ticket readers, etc.; f) operating various I/O devices such as, for example, displays 435, input devices 430; etc. For instance, the processor 410 may send messages including game play information to the displays 435 to inform players of cards dealt, wagering information, and/or other desired information.

Peripheral devices 422 may include several device interfaces such as, for example: transponders 454, wire/wireless power supply devices, PPD docking components, player tracking devices, card readers, bill validator/paper ticket readers, etc. Such devices may each comprise resources for handling and processing configuration indicia such as a microcontroller that converts voltage levels for one or more scanning devices to signals provided to processor 410. In one embodiment, application software for interfacing with peripheral devices 422 may store instructions (such as, for example, how to read indicia from a portable device) in a memory device such as, for example, non-volatile memory, hard drive or a flash memory.

In at least one implementation, the intelligent gaming table may include card readers such as used with credit cards, or other identification code reading devices to allow or require player identification in connection with play of the card game and associated recording of game action. Such a user identification interface can be implemented in the form of a variety of magnetic card readers commercially available for reading a user-specific identification information. The user-specific information can be provided on specially constructed magnetic cards issued by a casino, or magnetically coded credit cards or debit cards frequently used with national credit organizations such as VISA, MASTERCARD, AMERICAN EXPRESS, or banks and other institutions.

The intelligent gaming table may include other types of participant identification mechanisms which may use a fingerprint image, eye blood vessel image reader, or other suitable biological information to confirm identity of the user. Still further it is possible to provide such participant identification information by having the dealer manually code in the information in response to the player indicating his or her code name or real name. Such additional identification could also be used to confirm credit use of a smart card, transponder, and/or player's PPD.

The intelligent gaming table system 400 also includes memory 416 which may include, for example, volatile memory (e.g., RAM 409), non-volatile memory 419 (e.g., disk memory, FLASH memory, EPROMs, etc.), unalterable memory (e.g., EPROMs 408), etc. The memory may be configured or designed to store, for example: 1) configuration software 414 such as all the parameters and settings for a game playable on the intelligent gaming table; 2) associations 418 between configuration indicia read from a device with one or more parameters and settings; 3) communication protocols allowing the processor 410 to communicate with peripheral devices 422 and I/O devices 411; 4) a secondary memory storage device 415 such as a non-volatile memory device, configured to store gaming software related information (the gaming software related information and memory may be used to store various audio files and games not currently being used and invoked in a configuration or reconfiguration); 5) communication transport protocols (such as, for example, TCP/IP, USB, Firewire, IEEE1394, Bluetooth, IEEE 802.11x (IEEE 802.11 standards), hiperlan/2, HomeRF, etc.) for allowing the intelligent gaming table to communicate with local and non-local devices using such protocols; etc. In one implementation, the master table controller 412 communicates using a serial communication protocol. A few examples of serial communication protocols that may be used to communicate with the master table controller include but are not limited to USB, RS-232 and Netplex (a proprietary protocol developed by IGT, Reno, Nev.).

A plurality of device drivers 442 may be stored in memory 416. Example of different types of device drivers may include device drivers for intelligent gaming table components, device drivers for peripheral components 422, etc. Typically, the device drivers 442 utilize a communication protocol of some type that enables communication with a particular physical device. The device driver abstracts the hardware implementation of a device. For example, a device drive may be written for each type of card reader that may be potentially connected to the intelligent gaming table. Examples of communication protocols used to implement the device drivers include Netplex, USB, Serial, Ethernet 475, Firewire, I/O debouncer, direct memory map, serial, PCI, parallel, RF, Bluetooth™, near-field communications (e.g., using near-field magnetics), 802.11 (WiFi), etc. Netplex is a proprietary IGT standard while the others are open standards. According to a specific embodiment, when one type of a particular device is exchanged for another type of the particular device, a new device driver may be loaded from the memory 416 by the processor 410 to allow communication with the device. For instance, one type of card reader in intelligent gaming table system 400 may be replaced with a second type of card reader where device drivers for both card readers are stored in the memory 416.

In some embodiments, the software units stored in the memory 416 may be upgraded as needed. For instance, when the memory 416 is a hard drive, new games, game options, various new parameters, new settings for existing parameters, new settings for new parameters, device drivers, and new communication protocols may be uploaded to the memory from the master table controller 412 or from some other external device. As another example, when the memory 416 includes a CD/DVD drive including a CD/DVD designed or configured to store game options, parameters, and settings, the software stored in the memory may be upgraded by replacing a first CD/DVD with a second CD/DVD. In yet another example, when the memory 416 uses one or more flash memory 419 or EPROM 408 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the intelligent gaming table system 400 may also include various authentication and/or validation components 444 which may be used for authenticating/validating specified intelligent gaming table components such as, for example, hardware components, software components, firmware components, information stored in the intelligent gaming table memory 416, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Peripheral devices 422 may also include other devices/component(s) such as, for example: sensors 460, cameras 462, control consoles 420, transponders 454, wireless communication component(s) 456, wireless power component(s) 458, PPD docking component(s) 452, wager/gaming chip tracking component(s) 470, player tracking management component(s) 472, game state tracking component(s) 474, etc.

Sensors 460 may include, for example, optical sensors, pressure sensors, RF sensors, Infrared sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; detecting the presence and/or identity of PPDs placed within a player's PPD docking region, etc.

In one implementation, at least a portion of the sensors 460 and/or input devices 430 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the intelligent gaming table player displays and/or PPD displays may include input functionality for allowing players to provide their game play decisions/instructions (and/or other input) to the dealer using the touch keys and/or other player control sensors/buttons. Additionally, such input functionality may also be used for allowing players to provide input to other devices in the casino gaming network (such as, for example, player tracking systems, side wagering systems, etc.)

Wireless communication components 456 may include one or more communication interfaces having different architectures and utilizing a variety of protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

Wireless power components 458 may include, for example, components or devices which are operable for providing wireless power to other devices. For example, in one implementation, the wireless power components 458 may include a magnetic induction system which is adapted to provide wireless power to one or more PPDs at the intelligent gaming table. In one implementation, a PPD docking region may include a wireless power component which is able to recharge a PPD placed within the PPD docking region without requiring metal-to-metal contact.

According to a specific embodiment, Table Control Console 420 may be used to facilitate and execute game play operations, table configuration operations, player tracking operations, maintenance and inspection operations, etc. In one implementation, the Table Control Console 420 may include at least one display for displaying desired information, such as, for example, programming options which are available in setting up the system and customizing operational parameters to the desired settings for a particular casino or cardroom in which the system is being used. The Table Control Console 420 may also include a key operated switch which is used to control basic operation of the system and for placing the unit into a programming mode. The key operated switch can provide two levels of access authorization which restricts access by dealers to programming, or additional security requirements can be provided in the software which restricts programming changes to management personnel. Programming may be input in several different modes.

For example, in a specific embodiment where the intelligent gaming table is configured as a blackjack gaming table, programming can be provided using a touch screen display with varying options presented thereon and the programming personnel can set various operational and rules parameters, such as, for example: the shuffle mode, number of decks of cards used in the virtual card stack, options with regard to the portion of the stack which is used before the stack is cut, limits on the amounts which can be bet at a particular table, whether splits are accepted for play and to what degree, options concerning doubling down plays, whether the dealer hits or stands on soft 37, and other rules can be made variable dependent upon the particular form of the system programming used in the system, depending on the type of card game being played. Control keys may also be used in some forms of the invention to allow various menu options to be displayed and programming options to be selected using the control keys. Still further it is possible to attach an auxiliary keyboard (not shown) to the Table Control Console through a keyboard connection port. The auxiliary keyboard can then be used to more easily program the system, or be used in maintenance, diagnostic functions, etc.

According to specific embodiments, the Table Control Console 420 may also include a plurality of dealer operational controls provided in the form of dealer control sensors which, for example, may be implemented via electrical touch keys. The dealer control sensors may be used by the dealer to indicate that desired control functions should take place or further proceed. For example, different sensors may be used to implement a player's decision to: split his two similar cards and play them as two separate or split hands; double down; stand on the cards already dealt or assigned to that player; etc. Other sensors may be used to:

- command shuffling and dealing of a new hands to the participants;
- collect a player's cards;
- show a player's cards;
- verify PPD data (e.g., verify that a PPD is displaying the correct cards to the player without revealing the cards in the player's hand);
- deal new cards to selected players; authenticate a player's PPD;
- activate a PPD;
- replace a player's PPD with an alternate PPD;
- call security;
- request cocktail service;
- recall previous game play data;
- control display of multimedia content;
- enable/disable PPDs;
- read player selections;
- start a player tracking session;
- suspend a player tracking session;
- resume a player tracking session;
- merge two or more player tracking sessions;
- end and/or close a player tracking session;
- etc.

It will be appreciated that other functions may be attributed to other keys or input sensors of various types. For example, in one implementation, at least a portion of the Table Control Console touch keys can be assigned to implement additional functions, such as in changeable soft key assignments during the programming or setup of the system.

According to specific embodiments, the wager/gaming chip tracking component 470 may be adapted to automatically detect the presence and/or monetary amount of gaming chips which are located within a player's wagering zone (e.g., 302) and/or which are located with the player's personal space at the gaming table (such as, for example, the region defined by region 350 of FIG. 3). In one implementation, each wager/gaming chip tracking component 470 includes one or more gaming chip sensors which are immediately below or otherwise adjacent to a respective player station at the gaming table. The gaming chip sensors may be selected from several different types of sensors.

One suitable type of sensor is a weigh cell which senses the presence of a gaming chip thereon so that the master table controller knows at the start of a hand, that a player is participating in the next hand being played. A variety of weigh cells can be used. Another suitable type of sensor includes optical sensors. Such optical sensors can be photosensitive detectors which use changes in the sensed level of light striking the detectors. For example, in one implementation, the wagering sensor may use ambient light which beams from area lighting of the casino or other room in which it is placed. When a typical gaming chip is placed in a player's wagering zone (e.g., 302), the amount of light striking the detector located beneath the zone is measurably diminished by the opaque gaming chip. The detector conveys a suitable electrical signal which indicates that a gaming chip has been placed within the wagering zone 302. A variety of other alternative detectors can also be used. A further type of preferred gaming chip sensor is one which can detect coding included on or in the gaming chips to ascertain the value of the gaming chip or chips being placed by the players into the player wagering zones. A preferred form of this type of sensor or detector is used to detect an integrated circuit based radio frequency identification (RFID) unit which is included in or on the gaming chips. Such sensors are sometimes referred to as radio frequency identification detection or read-write stations.

It will be apparent to those skilled in the art that other memory types, including various computer readable media, may be used for storing and executing program instructions pertaining to the operation of the present invention. Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files including higher level code that may be executed by the computer using an interpreter.

According to specific embodiments, a variety of different game states may be used to characterize the state of current and/or past events which are occurring (or have occurred) at a selected gaming table. For example, in one embodiment, at any given time in a game, a valid current game state may be used to characterize the state of game play (and/or other related events, such as, for example, mode of operation of the gaming table, etc.) at that particular time. In at least one embodiment, multiple different states may be used to characterize different states or events which occur at the gaming table at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the gaming table may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming table. Examples of such entities may include, but are not limited to, one or more of the following (or combination thereof): master table controller, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, etc.

According to a specific embodiment, local game tracking components at the gaming table may be operable to automatically monitor game play activities at the gaming table, and/or to automatically identify key events which may trigger a transition of game state from one state to another as a game progresses. For example, in the case of Blackjack, a key event may include one or more events which indicate a change in the state of a game such as, for example: a new card being added to a card hand, the split of a card hand, a card hand being moved, a new card provided from a shoe, removal or disappearance of a card by occlusion, etc.

Depending upon the type of game being played at the gaming table, examples of other possible key events may include, but are not limited to, one or more of the following (or combination thereof):

start of a new hand/round;
end of a current hand/round;
start of a roulette wheel spin;
game start event;
game end event;
initial wager period start;
initial wager period end;
initial deal period start;
initial deal period end;
player card draw/decision period start;
player card draw/decision period end;
subsequent wager period start;
subsequent wager period end;
rake period start;
rake period end;
payout period start;
payout period end;
start of card burning period;
end of card burning period;
etc.

Additional details relating to various aspects of gaming table activity monitoring and/or other aspects of casino gaming technology are described in at least some of the following references:

U.S. Patent/Publication Number US20060252554A1, entitled GAMING OBJECT POSITION ANALYSIS AND TRACKING, filed Mar. 21, 2006, by Gururajan, et al., herein incorporated by reference in its entirety for all purposes;

U.S. Patent/Publication Number US20050272501A1, entitled AUTOMATED GAME MONITORING, filed Feb. 8, 2005, by Tran, et al., herein incorporated by reference in its entirety for all purposes;

U.S. Patent/Publication Number US7058204B2, entitled MULTIPLE CAMERA CONTROL SYSTEM, filed Sep. 26, 2001, by Hildreth, et al., herein incorporated by reference in its entirety for all purposes;

U.S. Patent/Publication Number US5534917A, entitled VIDEO IMAGE BASED CONTROL SYSTEM, filed May 9, 1991, by MacDougall, herein incorporated by reference in its entirety for all purposes;

U.S. Patent/Publication Number US20060252521A1, entitled TABLE GAME TRACKING, filed Mar. 21, 2006, by Gururajan, et al., herein incorporated by reference in its entirety for all purposes;

U.S. Patent/Publication Number US2004876620A, entitled APPARATUS AND METHOD FOR A CARD DISPENSING SYSTEM, filed Jun. 28, 2004, by Gururajan, herein incorporated by reference in its entirety for all purposes;

U.S. Patent/Publication Number US2004876620A, entitled APPARATUS AND METHOD FOR A CARD DISPENSING SYSTEM, filed Jun. 28, 2004, by Gururajan, herein incorporated by reference in its entirety for all purposes;

U.S. Patent/Publication Number US20050026680A1, entitled SYSTEM, APPARATUS AND METHOD FOR AUTOMATICALLY TRACKING A TABLE GAME, filed Jun. 28, 2004, by Gururajan, herein incorporated by reference in its entirety for all purposes;

U.S. Patent/Publication Number US20020034978A1, entitled ACTIVITY MANAGEMENT SYSTEM, filed Oct. 9, 2001, by Legge, et al., herein incorporated by reference in its entirety for all purposes; and U.S. application Ser. No. 11/595,798, filed on Nov. 10, 2006, naming Little, et al. as inventors, and titled, "REMOTE CONTENT MANAGEMENT AND RESOURCE SHARING ON A GAMING MACHINE AND METHOD OF IMPLEMENTING SAME," which is incorporated herein by reference and for all purposes.

U.S. patent application Ser. No. 10/040,239, entitled, "GAME DEVELOPMENT ARCHITECTURE THAT DECOUPLES THE GAME LOGIC FROM THE GRAPHICS LOGIC," published on Apr. 24, 2003 as U.S. Patent Publication No. 20030078103, which is incorporated herein by reference and for all purposes;

U.S. patent application Ser. No. 11/425,998, entitled "PROGRESSIVE TABLE GAME BONUSING SYSTEMS AND METHODS," by Nguyen et al, which is incorporated herein by reference and for all purposes; and U.S. Patent/Publication Number US20060287068A1, entitled PROBLEM GAMBLING DETECTION IN TABLETOP GAMES, filed Jun. 6, 2006, by Walker, et al., herein incorporated by reference in its entirety for all purposes.

Other System Embodiments

Figure 9:
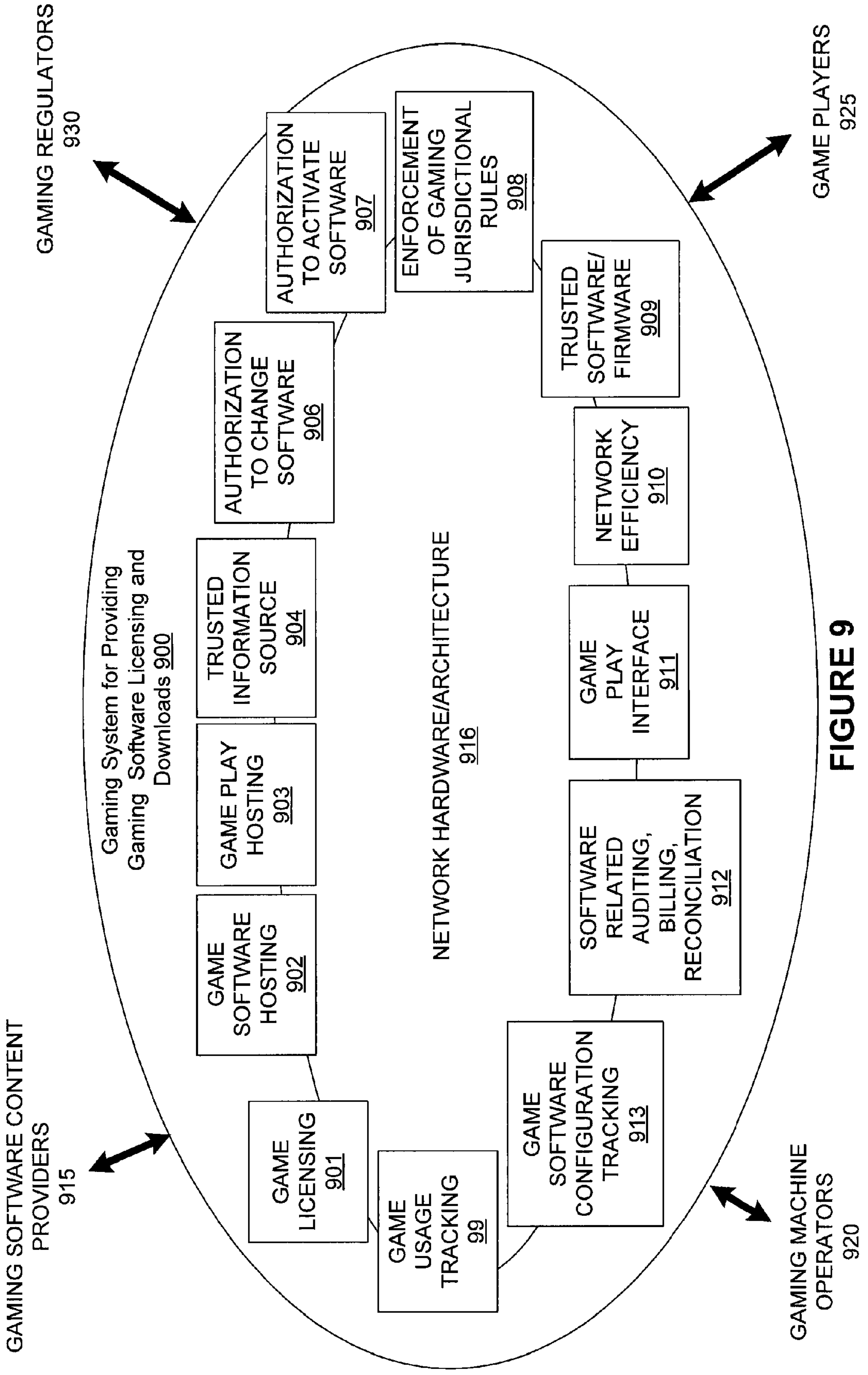
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with example embodiments are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 2003/0203756, by Jackson, filed on Apr. 25, 2002 and entitled, "Authentication in a Secure Computerized Gaming System, which is incorporated herein in its entirety and for all purposes.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In example embodiments, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Techniques and mechanisms of the present invention will sometimes be described in singular form for clarity. However, it should be noted that particular embodiments include multiple iterations of a technique or multiple instantiations of a mechanism unless noted otherwise.

Various embodiments may be directed to methods, systems and/or computer program products for facilitating player tracking activities at a casino gaming table which includes a plurality of player stations. At least one embodiment may include functionality for: automatically detecting a presence of a first player at the gaming table; determining a first set of criteria relating to initiation of a player tracking session for the first player; automatically determining whether the first set of criteria has been satisfied; delaying initiation of the player tracking session for the first player in response to a determination that the first set of criteria has not been satisfied; and automatically initiating the player tracking session for the first player in response to a determination that the first set of criteria has been satisfied.

Some embodiments may further include functionality for tracking, in response to initiating the player tracking session for the first player, player rating information associated with activities performed by the first player at the gaming table.

Some embodiments may further include functionality for automatically and passively determining an identity of the first player; and automatically and passively associating the first player with a selected player station at the gaming table.

In some embodiments, the first set of criteria specifies a first event relating to detection of a presence of the player's player tracking device within a predetermined region of space.

In some embodiments, the first set of criteria specifies a first event relating to detection of a presence of at least one gaming chip within a wagering zone associated with the player.

Some embodiments may further include functionality for automatically associating the first player with a selected player station at the gaming table, wherein the first set of criteria specifies a first event relating to detection of a presence of at least one gaming chip within a wagering zone associated with the selected player station.

In some embodiments, the first set of criteria specifies a first event relating to detection of input from the first player to initiate a player tracking session for the first player.

In some embodiments, the first set of criteria specifies a first event relating to detection of a presence of the player's player tracking device as being located within a predetermined region of space; and/or the first set of criteria specifies a second event relating to detection of a presence of at least one gaming chip within a specified gaming chip placement area.

Other embodiments may be directed to methods, systems and/or computer program products for facilitating player tracking activities at a casino gaming table which includes a plurality of player stations. At least one embodiment may include functionality for: automatically detecting a presence of a first player at the gaming table; initiating a player tracking session for the first player; determining a first set of criteria relating to suspension of the player tracking session for the first player; automatically determining whether the first set of criteria has been satisfied; and automatically suspending the player tracking session for the first player in response to a determination that the first set of criteria has been satisfied.

Some embodiments may further include functionality for delaying suspension of the player tracking session for the first player in response to a determination that the first set of criteria has not been satisfied.

In some embodiments, the first set of criteria specifies a first event relating to detection of an absence of the first player at the gaming table.

In some embodiments, the first set of criteria specifies a first event relating to detection of the player's player tracking device as not being within a predetermined region of space.

In some embodiments, the first set of criteria specifies a first event relating to detection of detection of input from the first player to suspend the player tracking session.

In some embodiments, the first set of criteria specifies a first event relating to detection of no wagering activity being conducted by the first player within a predetermined time interval.

In some embodiments, the first set of criteria specifies a first event relating to detection of an absence of at least one gaming chip within a specified gaming chip placement area of the gaming table.

Some embodiments may further include functionality for: determining a second set of criteria relating to resumption of the suspended player tracking session for the first player; automatically determining whether the second set of criteria has been satisfied; and automatically resuming the suspended player tracking session for the first player in response to a determination that the second set of criteria has been satisfied.

Other embodiments may be directed to methods, systems and/or computer program products for facilitating player tracking activities at a casino gaming table which includes a plurality of player stations. At least one embodiment may include functionality for: automatically detecting a presence of a first player at the gaming table; initiating a player tracking session for the first player; determining a first set of criteria relating to ending of the player tracking session for the first player; automatically determining whether the first set of criteria has been satisfied; and automatically ending the player tracking session for the first player in response to a determination that the first set of criteria has been satisfied.

Some embodiments may further include functionality for delaying ending of the player tracking session for the first player in response to a determination that the first set of criteria has not been satisfied.

In some embodiments, the first set of criteria specifies a first event relating to detection of an absence of the first player at the gaming table.

In some embodiments, the first set of criteria specifies a first event relating to detection of the player's player tracking device as not being within a predetermined region of space.

In some embodiments, the first set of criteria specifies a first event relating to detection of detection of input from the first player to end the player tracking session.

In some embodiments, the first set of criteria specifies a first event relating to detection of no wagering activity being conducted by the first player within a predetermined time interval.

In some embodiments, the first set of criteria specifies a first event relating to detection of an absence of at least one gaming chip within a specified gaming chip placement area of the gaming table.

In some embodiments, the first set of criteria specifies a first event relating to detection of an occurrence of a timeout event relating to the first player's player tracking session.

Some embodiments may further include functionality for automatically closing the player tracking session in response to the ending of the player tracking session, wherein the closing of the player tracking session includes automatically estimating an amount of gaming chips currently in possession of the first player.

Some embodiments may further include functionality for automatically closing the player tracking session in response to the ending of the player tracking session, wherein the closing of the player tracking session includes automatically estimating an amount of gaming chips in possession of the first player as of a time when the player tracking session was ended.

This application incorporates by reference for all purposes U.S. patent application Ser. No. 10/214,936, entitled "FLEXIBLE LOYALTY POINTS PROGRAMS" by Kaminkow et al., filed on Aug. 6, 2002.

This application incorporates by reference for all purposes U.S. patent application Ser. No. 09/927,742 entitled "FLEXIBLE LOYALTY POINTS PROGRAMS," filed Aug. 10, 2001.

This application incorporates by reference for all purposes U.S. patent application Ser. No. 10/170,278, entitled "PLAYER TRACKING ASSEMBLY FOR COMPLETE PATRON TRACKING FOR BOTH GAMING AND NON-GAMING CASINO ACTIVITY" by Timothy Moser, filed on Jun. 12, 2002.

This application incorporates by reference for all purposes U.S. patent application Ser. No. 11/515,184, by Nguyen et al., entitled "INTELLIGENT CASINO GAMING TABLE AND SYSTEMS THEREOF", filed on Sep. 1, 2006.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A system comprising:

at least one processor;

at least one interface configured to provide a communication link to at least one other network device in a gaming network;

at least one memory device; and a gaming table comprising:

(a) a media detector/reader configured to receive signals and obtain information from a player tracking device associated with a first player; and (b) a gaming chip tracking system configured to: (i) automatically detect wagering activity of the first player; (ii) automatically detect any gaming chips within a plurality of different gaming chip placement areas of the gaming table; (iii) automatically detect information relating to an amount and a value of each gaming chip within one of the gaming chip placement areas of the gaming table; and (iv) automatically detect information relating to a walk away amount associated with the first player;

the system being configured to:

(a) automatically detect, with the media detector/reader of the gaming table, the first player's presence at the gaming table; and (b) if a first set of criteria is satisfied, said first set of criteria being satisfied when: (i) the first player's presence is detected at the gaming table, and (ii) a designated quantity of gaming chips is detected within one or more gaming chip placement areas of the gaming table associated with the first player:

(A) automatically initiate a player tracking session for the first player; and (B) track player rating information from at least the automatically detected information relating to the amount and the value of each gaming chip within the one of the gaming chip placement areas of the gaming table;

wherein: the player tracking device is a handheld computing device configured to perform at least one of the following functions: (i) provide a first interface by which the first player selects cards for discarding or holding; (ii) provide a second interface by which the first player performs the wagering activity; (iii) initiating, suspending or ending a flat rate play session; (iv) display player account data; (v) display game play assistance information; (vi) display casino layout information; (vii) display promotional information; (viii) display multimedia information from external sources; (ix) notify the first player of messages; and (x) display the first player's current location.

2. A system comprising:

at least one processor;

at least one interface configured to provide a communication link to at least one other network device in a gaming network;

at least one memory device; and a gaming table comprising:

(a) a media detector/reader configured to receive signals and obtain information from a player tracking device associated with a first player; and (b) a gaming chip tracking system configured to: (i) automatically detect wagering activity of the first player; (ii) automatically detect any gaming chips within a plurality of different gaming chip placement areas of the gaming table; (iii) automatically detect information relating to an amount and a value of each gaming chip within one of the gaming chip placement areas of the gaming table; and (iv) automatically detect information relating to a walk away amount associated with the first player;

the system being configured to:

(a) automatically detect the first player's presence at the gaming table;

(b) if a first set of criteria is satisfied:

(i) initiate a player tracking session for the first player;

(ii) track player rating information from at least the automatically detected information relating to the amount and the value of each gaming chip within the one of the gaming chip placement areas of the gaming table;

(c) determine a set of suspension criteria relating to suspension of the player tracking session for the first player;

(d) determine a set of ending criteria relating to ending of the player tracking session for the first player;

(e) automatically determine whether the set of suspension criteria has been satisfied and whether the set of ending criteria has been satisfied;

(f) if the set of suspension criteria has been satisfied, automatically suspend the player tracking session for the first player without ending the player tracking session for the first player; and (g) if the set of ending criteria has been satisfied, automatically end the player tracking session for the first player;

wherein: the player tracking device is a handheld computing device configured to perform at least one of the following functions: (i) provide a first interface by which the first player selects cards for discarding or holding; (ii) provide a second interface by which the first player performs the wagering activity; (iii) initiating, suspending or ending a flat rate play session; (iv) display player account data; (v) display game play assistance information; (vi) display casino layout information; (vii) display promotional information; (viii) display multimedia information from external sources; (ix) notify the first player of messages; and (x) display the first player's current location.

3. A method comprising:

(a) automatically detecting, with a gaming chip tracking system: (i) wagering activity of a first player; (ii) any gaming chips within a plurality of different gaming chip placement areas of a gaming table; (iii) information relating to an amount and a value of each gaming chip within one of the gaming chip placement areas of the gaming table; and (iv) information relating to a walk away amount associated with the first player;

(b) automatically detecting, with a media detector/reader of the gaming table, the media detector/reader configured to receive signals and obtain information from a player tracking device associated with the first player, the first player's presence at the gaming table; and (c) if a first set of criteria is satisfied, said first set of criteria being satisfied when: (i) the first player's presence is detected at the gaming table, and (ii) a designated quantity of gaming chips is detected within one or more gaming chip placement areas of the gaming table associated with the first player:

(A) automatically initiating a player tracking session for the first player; and (B) tracking player rating information from at least the automatically detected information relating to the amount and the value of each gaming chip within the one of the gaming chip placement areas of the gaming table;

wherein: the player tracking device is a handheld computing device configured to perform at least one of the following functions: (i) provide a first interface by which the first player selects cards for discarding or holding; (ii) provide a second interface by which the first player performs the wagering activity; (iii) initiating, suspending or ending a flat rate play session; (iv) display player account data; (v) display game play assistance information; (vi) display casino layout information; (vii) display promotional information; (viii) display multimedia information from external sources; (ix) notify the first player of messages; and (x) display the first player's current location.

4. A method comprising:

(a) automatically detecting, with a gaming chip tracking system: (i) wagering activity of a first player; (ii) any gaming chips within a plurality of different gaming chip placement areas of a gaming table; (iii) information relating to an amount and a value of each gaming chip within one of the gaming chip placement areas of the gaming table; and (iv) information relating to a walk away amount associated with the first player;

(b) automatically detecting, with a media detector/reader of the gaming table, the media detector/reader configured to receive signals and obtain information from a player tracking device associated with the first player, the first player's presence at the gaming table;

(c) if a first set of criteria is satisfied:

(i) initiating a player tracking session for the first player; and (ii) tracking player rating information from at least the automatically detected information relating to the amount and the value of each gaming chip within the one of the gaming chip placement areas of the gaming table;

(d) determining a set of suspension criteria relating to suspension of the player tracking session for the first player;

(e) determining a set of ending criteria relating to ending of the player tracking session for the first player;

(f) automatically determining whether the set of suspension criteria has been satisfied and whether the set of ending criteria has been satisfied;

(g) if the set of suspension criteria has been satisfied, automatically suspending the player tracking session for the first player without ending the player tracking session for the first player; and (h) if the set of ending criteria has been satisfied, automatically ending the player tracking session for the first player;

wherein: the player tracking device is a handheld computing device configured to perform at least one of the following functions: (i) provide a first interface by which the first player selects cards for discarding or holding; (ii) provide a second interface by which the first player performs the wagering activity; (iii) initiating, suspending or ending a flat rate play session; (iv) display player account data; (v) display game play assistance information; (vi) display casino layout information; (vii) display promotional information; (viii) display multimedia information from external sources; (ix) notify the first player of messages; and (x) display the first player's current location.

* * * * *